United States Patent
Finlayson et al.

(10) Patent No.: US 12,162,758 B2
(45) Date of Patent: *Dec. 10, 2024

(54) LITHIUM ION BATTERY USING HIGH SURFACE AREA NANOTUBES

(71) Applicant: MOLECULAR REBAR DESIGN, LLC, Austin, TX (US)

(72) Inventors: Malcolm Francis Finlayson, Houston, TX (US); Clive P. Bosnyak, Dripping Springs, TX (US); Jerzy Gazda, Austin, TX (US); Vinay Bhat, Austin, TX (US); Nancy Henderson, Austin, TX (US); Emily Barton Cole, Austin, TX (US)

(73) Assignee: MOLECULAR REBAR DESIGN, LLC

( * ) Notice: Subject to any disclaimer, the term of this patent is extended or adjusted under 35 U.S.C. 154(b) by 924 days.

This patent is subject to a terminal disclaimer.

(21) Appl. No.: 17/080,280

(22) Filed: Oct. 26, 2020

(65) Prior Publication Data

US 2021/0047185 A1    Feb. 18, 2021

Related U.S. Application Data

(63) Continuation-in-part of application No. 16/420,762, filed on May 23, 2019, now Pat. No. 11,554,957.

(Continued)

(51) Int. Cl.
    *C01B 32/174*      (2017.01)
    *C01B 32/159*      (2017.01)
(Continued)

(52) U.S. Cl.
CPC .......... *C01B 32/174* (2017.08); *C01B 32/159* (2017.08); *H01M 4/587* (2013.01);
(Continued)

(58) Field of Classification Search
None
See application file for complete search history.

(56) References Cited

U.S. PATENT DOCUMENTS

| 6,783,746 B1 | 8/2004 | Zhang et al. |
| 7,601,421 B2 | 10/2009 | Khabashesku et al. |

(Continued)

FOREIGN PATENT DOCUMENTS

| CN | 1402888 A | 3/2003 |
| KR | 10-2008-0111488 | 12/2008 |

(Continued)

OTHER PUBLICATIONS

Peigney et al., "Specific Surface area of carbon nanotubes and bundles of carbon nanotubes," Carbon 39 (2001) pp. 507-514 [From Parent U.S. Appl. No. 16/420,762, filed May 23, 2019].

(Continued)

*Primary Examiner* — Michael Forrest
(74) *Attorney, Agent, or Firm* — Hunton Andrews Kurth LLP

(57) ABSTRACT

High-surface area carbon nanotubes having targeted, or selective, species of oxygen containing species levels, types and/or content on either or both of the interior and exterior of the tube walls are claimed. Such carbon nanotubes can have little to none inner tube surface oxygen containing species, or differing amounts and/or types of oxygen containing species between the tubes' inner and outer surfaces or amongst the carbon nanotubes. Additionally, such high-surface area carbon nanotubes or their assemblages may have greater lengths and diameters, creating useful mechanical, electrical, and thermal properties.

17 Claims, 12 Drawing Sheets

Related U.S. Application Data

(60) Provisional application No. 62/674,874, filed on May 22, 2018.

(51) Int. Cl.
*H01M 4/02* (2006.01)
*H01M 4/587* (2010.01)
*H01M 4/62* (2006.01)
*H01M 10/056* (2010.01)
*H01M 50/446* (2021.01)

(52) U.S. Cl.
CPC ......... *H01M 4/622* (2013.01); *H01M 10/056* (2013.01); *H01M 50/446* (2021.01); *C01B 2202/02* (2013.01); *C01B 2202/22* (2013.01); *C01B 2202/32* (2013.01); *C01P 2004/02* (2013.01); *H01M 2004/021* (2013.01); *H01M 2300/0082* (2013.01); *H01M 2300/0091* (2013.01)

(56) References Cited

U.S. PATENT DOCUMENTS

| | | | |
|---|---|---|---|
| 7,763,229 B2 | 7/2010 | Nikolaev et al. | |
| 10,608,282 B2* | 3/2020 | Bosnyak | H01G 11/52 |
| 11,554,957 B2* | 1/2023 | Finlayson | C01B 32/16 |
| 2002/0125470 A1* | 9/2002 | Hoenlein | C01B 32/174 |
| | | | 257/1 |
| 2003/0049443 A1 | 3/2003 | Nishimura et al. | |
| 2004/0197638 A1* | 10/2004 | McElrath | H01M 8/1011 |
| | | | 977/843 |
| 2008/0318049 A1* | 12/2008 | Hata | C01B 32/178 |
| | | | 423/447.2 |
| 2010/0004468 A1 | 1/2010 | Wong et al. | |
| 2012/0328940 A1 | 12/2012 | Bosnyak et al. | |
| 2013/0344396 A1 | 12/2013 | Bosnyak et al. | |
| 2016/0095940 A1 | 4/2016 | Swogger et al. | |
| 2016/0190538 A1 | 6/2016 | Lee et al. | |
| 2016/0340193 A1 | 11/2016 | Uejima | |
| 2017/0114210 A1 | 4/2017 | Bosnyak et al. | |
| 2017/0292063 A1 | 10/2017 | Sturtevant et al. | |

FOREIGN PATENT DOCUMENTS

| | | | |
|---|---|---|---|
| WO | 200135473 A1 | 5/2001 | |
| WO | 2008054845 A2 | 5/2008 | |
| WO | 2008067137 A2 | 6/2008 | |
| WO | 2011163129 A2 | 12/2011 | |
| WO | 2018087542 A1 | 5/2018 | |

OTHER PUBLICATIONS

Brozena et al (Outer Wall Selectively Oxidized, Water-Soluble Double-Walled Carbon nanotubes, J. Am. Chem. Soc. (2010), 132, pp. 3939-3938 [From Parent U.S. Appl. No. 16/420,762, filed May 23, 2019].

Int'l Search Report & Written Opinion (PCT/US2019/033764), dated Sep. 25, 2019 [From Parent U.S. Appl. No. 16/420,762, filed May 23, 2019].

Chaturvedi, Poornendu et al., "Carbon Nanotube-Purification and Sorting Protocols" Defence Science Journal, vol. 58, No. 5, Sep. 2008, pp. 591-599.

Kim, Dong Sik et al., Individualization of Single-walled Carbon Nanotubes: Is the Solvent Important? Small, 2005, 1, No. 11, pp. 1117-1124.

* cited by examiner

Effect of Shear

Effect of Shear (Higher Magnification)

0.8% MR /0.02% Oxidized OCSiAl

LITHIUM ION BATTERY USING HIGH SURFACE AREA NANOTUBES

CROSS-REFERENCE TO RELATED APPLICATIONS

This application is a continuation-in-part of Ser. No. 16/420,762 filed on May 23, 2019 which application is incorporated herein by reference.

FIELD OF INVENTION

The present invention is directed to an improved energy storage device comprising novel carbon nanotube compositions having increased surface area, targeted oxidation levels and/or content, and formulations thereof.

BACKGROUND AND SUMMARY OF THE INVENTION

Many energy storage devices like batteries, capacitors and photovoltaics can utilize a cathode, an anode, binder and/or an electrolyte and separator film to provide enhanced performances in mechanical stabilization, improved electrical conduction of the powder used in cathodes or electrodes and ion transport in the electro- or photoactive material and electrolyte.

Lithium ion batteries are used extensively for portable electronic equipment and batteries such as lithium ion and lead-acid are increasingly being used to provide electrical back-up for wind and solar energy. The salts for the cathode materials in lithium ion batteries are generally known to have poor electrical conductivity and poor electrochemical stability which results in poor cycling (charge/discharge) ability. Both cathode and anode materials in many battery types such as lithium ion based batteries exhibit swelling and deswelling as the battery is charged and discharged. This spatial movement leads to further separation of some of the particles and increased electrical resistance. The high internal resistance of the batteries, particularly in large arrays of lithium ion batteries such as used in electric vehicles, can result in excessive heat generation leading to runaway chemical reactions and fires due to the organic liquid electrolyte.

Lithium primary batteries consist, for example, of lithium, poly(carbon monofluoride) and lithium tetrafluoroborate together with a solvent such as gamma-butyrolactone as an electrolyte. These lithium primary batteries have excellent storage lifetimes, but suffer from only being able to provide low current and the capacity is about one tenth of what is theoretically possible. This is ascribed to the poor electrical conductivity of the poly(carbon monofluoride). In some cases a portion manganese dioxide is added to aid in the electrical conductivity and power of the lithium battery.

Attempts to overcome the deficiencies of poor adhesion to current collectors and to prevent microcracking during expansion and contraction of rechargeable batteries have included development of binders. Binders such as polyacrylic acid (PAA), for cathodes, poly(styrene butadiene), carboxymethylcellulose (CMC), styrene-butadiene (SBR), for anodes, and particularly polyvinylidene fluoride (PVDF) for cathodes and anodes, are used in lithium based batteries to hold the active material particles together and to maintain contact with the current collectors i.e., the aluminum (Al) or the copper (Cu) foil. The PAA and SBR are used as aqueous suspensions or solutions and are considered more environmentally benign than organic solvent based systems such as n-methyl 2 pyrrolidone (NMP) with PVDF.

A cathode electrode of a lithium ion battery is typically made by mixing active material powder, such as lithium iron phosphate, binder powder, i.e., high molecular weight PVDF, solvent such as NMP if using PVDF, and additives such as carbon black, into a slurry (paste) and pumping this slurry to a coating machine. An anode electrode for a lithium ion battery is made similarly by typically mixing graphite, or other materials such as silicon, as the active material, together with the binder, solvent and additives. The coating machines spread the mixed slurry (paste) on both sides of the Al foil for the cathode and Cu foil for the anode. The coated foil is subsequently calendared to make the electrode thickness more uniform, followed by a slitting operation for proper electrode sizing and drying.

For zinc-carbon batteries, the positive electrode can consist of a wet powder mix of manganese dioxide, a powdered carbon black and electrolyte such as ammonium chloride and water. The carbon black can add electrical conductivity to the manganese dioxide particles, but is needed at high weight percentages in the range about 10 to 50% by weight of manganese dioxide. These high amounts of carbon black needed for improved electrical conductivity, or reduced impedance of the battery, diminish the capacity per unit volume of the battery as less manganese dioxide can be employed per unit volume of the positive paste mix. Thus, in general, there is a need to improve the impedance of a battery while maximizing the amount of active material per unit volume.

For a lead-acid battery the anode can be made from carbon particles together with a binder to provide higher specific capacity (capacity per unit weight). The anode of a zinc-carbon battery is often a carbon rod typically made of compressed carbon particles, graphite and a binder such as pitch. The carbon particle anodes tend to have poor mechanical strength leading to fracture under conditions of vibration and mechanical shock.

The characteristics of the cathode, anode, or binder material are important for both manufacturing and performance of the battery. Some of these characteristics of relevance are electrical and ionic conductivity, tensile strength and extensibility, adhesion to particles as well as the foils, and swelling of electrolyte. Improvement of electrical and ionic conductivity is needed for improved battery capacity and power. Materials such as lithium manganese oxide for cathodes and silicon particles for anodes exhibit much lower practical specific capacity than theoretically available. A higher electrical and ionic conductivity binder material would be most beneficial to achieve specific capacities closer to their theoretical values. It is desirable to improve the tensile and adhesive strength of binders so that less binder material can be employed and also improve the battery cycling lifetime. Addition of conductive particles, such as carbon black decreases the tensile strength and extensibility of binders. Controlled swelling of the binder in electrolyte is also important. If too much swelling occurs, this separates the particles and significantly increases the inter-particle ohmic resistance. Also, since the particles of the anode or cathode are coated with binder, the layer thickness of the binder can be as thin as 50 to 100 nanometers. This layer thickness precludes uniform distributions of carbon particles of sizes larger than the binder layer thickness. For example, multiwall carbon nanotubes as usually made in a gas phase reactor consist of bundles with diameters ranging from about 50 to 500 microns in diameter and would therefor reside only at the interstitial spaces between the particles.

Impurities, such as non-lithium salts, iron, and manganese to name a few, with the binder can also be highly deleterious to battery performance. Typically, high purity of the binder material, and other additives comprising the binder material such as carbon black to improve electrical conductivity, is an important factor to minimize unwanted side reactions in the electrochemical process. For example, in alkaline-manganese dioxide batteries the total iron in the manganese dioxide is less than 100 ppm to prevent hydrogen gassing at the anode. Commercially available carbon nanotubes such as NC7000™ (Nanocyl) or Graphistrength® (Arkema) can contain as much as ten percent or more by weight of residual metal catalysts and are not considered advantageous for batteries at these levels of impurity. Generally, the impurity residue of the nanotubes employed herein may be less than about 5 weight percent, or less than about 2 weight percent, or less than about 1 weight percent.

For photovoltaics, lines of conductive paste ink, made from solvents, binders, metal powder and glass frit, are screen-printed onto solar panel modules. The binders are usually polymer based for improved printability, such as ETHOCEL™ (Dow Chemical Company). During the burning off of the polymer and cooling the lines can crack due to shrinkage forces and so increase impedance. It is highly desirable to have a more robust conductive paste ink to prevent cracking during heating and cooling.

Efforts to improve the safety of lithium ion batteries have included using non-flammable liquids such as ionic liquids, for example, ethyl-methyl-imidazolium bis-(trifluoromethanesulfonyl)-imide (EMI-TFSI), and solid polymer, sometimes with additional additives, for example, polyethylene oxide with titanium dioxide nanoparticles, or inorganic solid electrolytes such as a ceramic or glass of the type glass ceramics, $Li_{1+x+y}Ti_{2-x}Al_xSi_yP_{3-y}O_{12}$ (LTAP). The electrical conductivity values of organic liquid electrolytes are in the general range of $10^{-2}$ to $10^{-1}$ S/cm. Polymer electrolytes have electrical conductivity values in the range of about $10^{-7}$ to $10^{-4}$ S/cm, dependent on temperature, whereas inorganic solid electrolytes generally have values in the range $10^{-8}$ to $10^{-5}$ S/cm. At room temperature most polymer electrolytes have electrical conductivity values around $10^{-5}$ S/cm. The low ionic conductivities of polymer and inorganic solid electrolytes are presently a limitation to their general use in energy storage and collection devices. It is thus highly desirable to improve the conductivity of electrolytes, and particularly with polymer and inorganic electrolytes because of their improved flammability characteristics relative to organic liquids. Also, it is desirable to improve the mechanical strength of solid electrolytes in battery applications requiring durability in high vibration or mechanical shock environments, as well as in their ease of device fabrication.

In alkaline batteries the electrolyte is typically potassium hydroxide. Alkaline batteries are known to have significantly poorer capacity on high current discharge than low current discharge. Electrolyte ion transport limitations as well as polarization of the zinc anode are known reasons for this. An increase in the electrolyte ion transport is highly desirable.

Amongst new generation thin film photovoltaic technologies, dye sensitized solar cells (DSSCs) possess one of the most promising potentials in terms of their cost-performance ratio. One of the most serious drawbacks of the present DSSCs technology is the use of liquid and corrosive electrolytes which strongly limit their commercial development. An example of an electrolyte currently used for DSSCs is potassium iodide/iodine. Replacement of the presently used electrolytes is desirable, but candidate electrolytes have poor ion transport.

Typical electrolytic capacitors are made of tantalum, aluminum, or ceramic with electrolyte systems such as boric acid, sulfuric acid or solid electrolytes such as polypyrrole. Improvements desired include higher rates of charge and discharge which is limited by ion transport of the electrolyte.

A separator film is often added in batteries or capacitors with liquid electrolytes to perform the function of electrical insulation between the electrodes yet allowing ion transport. Typically, in lithium batteries the separator film is a porous polymer film, the polymer being, for example a polyethylene, polypropylene, or polyvinylidene fluoride. Porosity can be introduced, for example, by using a matt of spun fibers or by solvent and/or film stretching techniques. In lead-acid batteries, where used the separator film is conventionally a glass fiber matt. The polymer separator film comprising high-surface area carbon nanotubes of this invention can improve ion transport yet still provide the necessary electrical insulation between the electrodes.

Carbon nanotubes can be classified by the number of walls in the tube, single-wall, double wall and multiwall. Carbon nanotubes are currently manufactured as agglomerated nanotube balls, bundles or forests attached to substrates. Once removed from the substrate, manufactured nanotubes often form tightly bound "tree-trunk" like arrangements, particularly with single wall and double wall carbon nanotubes. The use of carbon nanotubes as a reinforcing agent in composites is an area in which carbon nanotubes are predicted to have significant utility. However, utilization of carbon nanotubes in these applications has been hampered due to the general inability to reliably produce higher-surface area carbon nanotubes and the ability to disperse carbon nanotubes in a matrix.

The present invention comprises improved cathodes, anodes, binders, electrolytes separator films, and composites for energy storage and collection devices like batteries, capacitors and photovoltaics comprising high-surface area carbon nanotubes, methods for their production and products obtained therefrom. High-surface area carbon nanotubes are formed by fibrillation of manufactured nanotubes. This fibrillation of nanotube is caused by a combination of targeted oxidation, and/or high energy forces such as shear forces, such as generated by sonication. Fibrillation of the tree-truck agglomerates causes the nanotubes to loosen, exposing the surface or a greater number of nanotubes and/or a greater portion of the surface the nanotubes to the surrounding environment. This allows for increased interaction between the surrounding materials and the exposed surface of the nanotubes.

DETAILED DESCRIPTION

Figure 1:
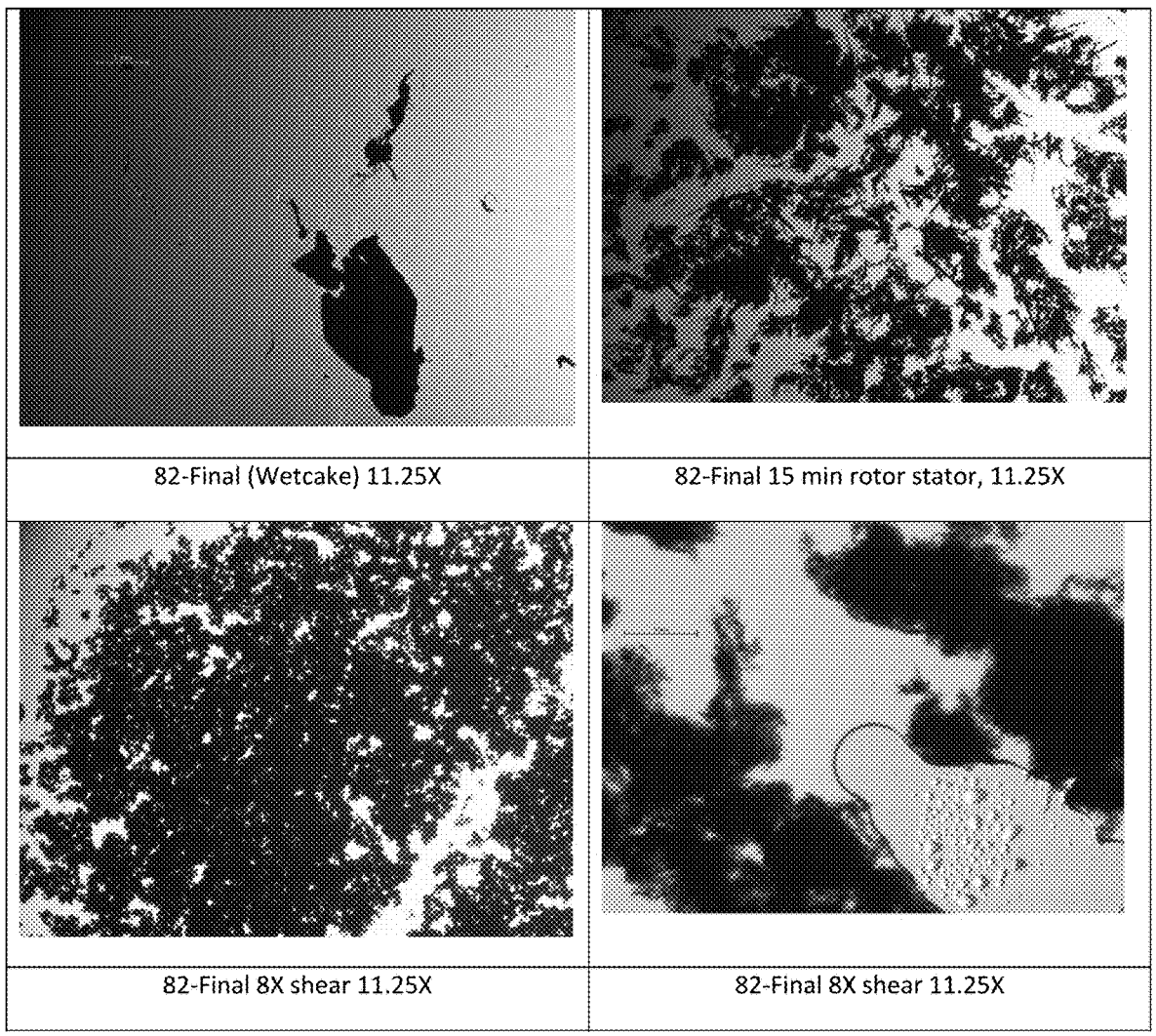
FIG. 1 is optical microscopy showing progression from a wet cake to rotor shearing.

In the following description, certain details are set forth such as specific quantities, sizes, etc., so as to provide a thorough understanding of the present embodiments disclosed herein. However, it will be evident to those of ordinary skill in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

While most of the terms used herein will be recognizable to those of ordinary skill in the art, it should be understood, however, that when not explicitly defined, terms should be interpreted as adopting a meaning presently accepted by those of ordinary skill in the art. In cases where the construction of a term would render it meaningless or essentially meaningless, the definition should be taken from Webster's Dictionary, 3rd Edition, 2009. Definitions and/or interpretations should not be incorporated from other patent applications, patents, or publications, related or not.

Functionalized carbon nanotubes of the present disclosure generally refer to the chemical modification of any of the carbon nanotube types described hereinabove. Such modifications can involve the nanotube ends, sidewalls, or both. Chemical modifications may include, but are not limited to covalent bonding, ionic bonding, chemisorption, intercalation, surfactant interactions, polymer wrapping, cutting, solvation, and combinations thereof. In some embodiments, the carbon nanotubes may be functionalized before, during and after being exfoliated partially or fully.

In various embodiments, a plurality of carbon nanotubes is disclosed comprising single wall, double wall or multi wall carbon nanotubes having an aspect ratio of at least about 50, or at least about 100, or at least about 250, or at least about 500, or at least about 700, or at least about 1,000, or at least about 1,500, or at least or about 2,000, or at least about 3000 up to about 6000, or up to about 5000. In various additional embodiments the carbon nanotubes comprise an overall (total) oxidation level of from about 0.01 weight percent to about 60 weight percent, preferably from about 0.1 weight percent to about 50 weight percent, more preferably from about 0.5 weight percent to 25 weight percent, more preferably from about 1 weight percent to 20 weight percent, or from about 0.1 weight percent to 5 weight percent. The oxidation level is defined as the amount by weight of oxygenated species covalently bound to the carbon nanotube determined by thermogravimetrically. In some embodiments the oxidation level may be 0, or at least about 0.01 weight percent up to about 2 weight percent. In other embodiments the oxidation level may be from at least about 2 weight percent up to about 50 weight percent. The thermogravimetric method for the determination of the percent weight of oxygenated species on the carbon nanotube involves taking about 7-15 mg of the dried oxidized carbon nanotube and heating at 5° C./minute from 100 degrees centigrade to 700 degrees centigrade in a dry nitrogen atmosphere. The percentage weight loss from 175-575 degrees centrigade or 200 to 600 degrees centigrade is taken as the percent weight loss of oxygenated species. The range is typically selected based on the onset of weight loss of the oxygenated species. For example, with polyethers attached to the carbon nanotubes the range is set from 175-575 degrees centrigrade. The oxygenated species can also be quantified using Fourier transform infra-red spectroscopy, FTIR, particularly in the wavelength range 1730-1680 cm' or alternatively 1760, 1530 and around 1060 cm'. In some embodiments the oxidation level may be 0%.

The carbon nanotubes can have oxidation species comprising carboxylic acid or derivative carbonyl containing species. The derivative carbonyl species can include phenols, ketones, quaternary amines, amides, esters, acyl halogens, monovalent, divalent, or multivalent metal salts and the like, and can vary between the inner and outer surfaces of the tubes. Other oxygenated species can comprise, although not limited to, ether groups, ketones, and lactones, alcohols and oxiranes without limit of molecular weight.

For example, one or more types of acid can be used to oxidize the tubes exterior surfaces, followed by water washing and the induced shear, thereby breaking and/or partially separating the tubes. If desired, the formed nanotubes or high-surface area bundles, having essentially no (or zero) interior tube wall oxidation can be further oxidized with a different oxidizing agent, or even the same oxidizing agent as that used for the tubes' exterior wall surfaces at a different concentration, resulting in differing amounts—and/or differing types—of interior and surface oxidation. Additional oxygen containing molecules can be reacted onto the carbon nanotubes, for example, although not limited to, by interaction of carboxylic acid groups and hydroxyl groups, carboxylic acid groups and amine groups, azide groups, and glycidyl groups.

As-made carbon nanotubes are treated with mechanical forces such as shear forces and/or oxidation to at least partially defibrillate tightly bundled nanotube "tree-trunks". This treatment exposes more of the surface area of the individual nanotubes to the surrounding environment. In some embodiments, the high-surface area nanotubes have at least about 10% greater surface area after treatment than before. In other embodiments, the high-surface area nanotubes have at least about 20%, at least about 30%, at least about 50%, at least about 75%, or at least about 100% greater surface area after treatment than before. In some embodiments, the high-surface area nanotubes have at least about 2.5×, at least about 3×, at least about 5×, at least about 7×, at least about 10×, or at least about 20× greater surface area after treatment than before.

BET surface area of nanotubes may be measured using $N_2$ BET isotherms according to ASTM D6556-16. The BET surface area of the nanotubes herein may vary depending upon the type of nanotubes, treatment methods, and desired applications. Typically, the single and double walled nanotubes treated with shear, oxidation, or both that are described herein usually have a BET surface area of at least about 400 $m^2/g$, or of at least about 500 $m^2/g$, or at least about 550 $m^2/g$, or at least about 600 $m^2/g$, or at least about 650 $m^2/g$, or at least about 700 $m^2/g$, or at least about 750 $m^2/g$, or at least about 800 $m^2/g$, or at least about 850 $m^2/g$, or at least about 900 $m^2/g$, or at least about 1000 $m^2/g$, or at least about 1100 $m^2/g$, or at least about 1200 $m^2/g$, or at least about 1300 $m^2/g$, or at least about 1400 $m^2/g$, or at least about 1500 m²/g, or at least about 1600 m²/g, up to about 3000 m²/g or higher, or up to about 2500 m²/g or higher, or up to to about 2000 m²/g or higher, or up to about 1900 m²/g, or up to about 1800 m²/g, or up to about 1700 m²/g.

Nanotube surface area may be measured using known methods including but not limited to gas adsorption techniques such as, for example, BET analysis, nitrogen, argon, and/or carbon dioxide adsorption. These measurements may be conducted isothermally. In some embodiments, the high-surface area nanotubes have a measured surface after being treated about 25%, about 40%, about 55%, about 80%, or about 95% greater than the measured surface area prior to treatment. In other embodiments, the high-surface area nanotubes have a measured surface after being treated about 2×, about 3×, about 4×, about 5×, about 7×, about 10×, or about 15× greater than the measured surface area prior to treatment.

In certain embodiments, high-surface area carbon nanotubes have a surface area greater than about 300 m²/g, or greater than about 500 m²/g, or greater than about 700 m²/g, or greater than about 1,000 m²/g, or greater than about 1,500 m²/g, or greater than about 2,000 m²/g, or greater than about 2,500 m²/g, or greater than about 3,000 m²/g. In other embodiments, high-surface area carbon nanotubes have a surface area less than about 500 m²/g, or less than about 700 m²/g, or less than about 1,000 m²/g, or less than about 1,500 m²/g, or less than about 2,000 m²/g, or less than about 2,500 m²/g, or less than about 3,000 m²/g.

As-made carbon nanotubes using metal catalysts such as iron, aluminum or cobalt can retain a significant amount of the catalyst associated or entrapped within the structure of the carbon nanotubes, as much as five weight percent or more. These residual metals can be deleterious in such applications as electronic devices because of enhanced corrosion or can interfere with the vulcanization process in curing elastomer composites. Furthermore, these divalent or multivalent metal ions can associate with carboxylic acid groups on the carbon nanotube and interfere with the loosening and/or dispersion processes. In some embodiments, the oxidized carbon nanotubes comprise a residual metal concentration of less than about 10,000 parts per million, ppm, less than about 5,000 ppm, less than about 3,000 ppm, less than about 1,000 ppm, or be substantially free from residual metals. The metals can be conveniently determined using energy dispersive X-ray spectroscopy or thermogravimetric methods.

Bosnyak et al., in various patent applications (e.g., US 2012-0183770 A1 and US 2011-0294013 A1), have made discrete carbon nanotubes through judicious and substantially simultaneous use of oxidation and shear forces, thereby oxidizing both the inner and outer surface of the nanotubes, typically to approximately the same oxidation level on the inner and outer surfaces, resulting in individual or discrete tubes.

In many embodiments, the present inventions differ from those earlier Bosnyak et al. applications and disclosures. The present inventions describe a composition of high-surface area carbon nanotubes having targeted, or selective, oxidation levels and/or content on the exterior and/or interior of the tube walls. Such novel carbon nanotubes can have little to no inner tube surface oxidation, or differing amounts and/or types of oxygen-containing species, e.g., oxidation, between the tubes' inner and outer surfaces or among the carbon nanotubes. In the process of oxidation, or attaching oxygen containing species, the degree of fibrillation can influence the population of tubes that differ by extent or type of oxygen containing species. For example, if many of the tubes are aligned as trunks then the tubes within the core of the trunk are less likely to contain oxygenated species than the tubes on the outermost portion of the trunk. These new nanotubes are useful in many applications, including cathode material, anode material, binder material, electrolyte material, separator film material, and or composites for energy storage devices for the improvement of mechanical, electrical, and thermal properties.

One embodiment of the present invention is a composition comprising a plurality of high-surface area carbon nanotubes, wherein the high-surface area carbon nanotubes comprise an interior and exterior surface, each surface comprising an interior surface oxidized species content (also called interior oxygen containing species content because the interior oxygen species may differ from the exterior oxygen species) and an exterior surface oxidized species content (also called exterior oxygen containing species content because the interior oxygen species may differ from the exterior oxygen species), wherein the interior surface oxidized species content differs from the exterior surface oxidized species content by at least 20%, and as high as 100%, preferably wherein the interior surface oxidized species content is less than the exterior surface oxidized species content.

The interior surface oxidized species content can be up to 3 weight percent relative to carbon nanotube weight, preferably from about 0.01 to about 3 weight percent relative to carbon nanotube weight, more preferably from about 0.01 to about 2, most preferably from about 0.01 to about 1. Especially preferred interior surface oxidized species content is from zero to about 0.01 weight percent relative to carbon nanotube weight.

The exterior surface oxidized species content can be from about 0.1 to about 65 weight percent relative to carbon nanotube weight, preferably from about 1 to about 40, more preferably from about 1 to about 20 weight percent relative to carbon nanotube weight. This is determined by comparing the exterior oxidized species content for a given plurality of nanotubes against the total weight of that plurality of nanotubes.

The interior and exterior surface oxidized species content totals can be from about 0.01 to about 65 weight percent relative to carbon nanotube weight.

Another embodiment of the invention is a composition comprising a plurality of high-surface area carbon nanotubes, wherein the high-surface area carbon nanotubes comprise an interior and exterior surface, each surface comprising an interior surface and an exterior surface oxidized species content, wherein the interior surface oxidized species content comprises from about 0.01 to less than about 1 percent relative to carbon nanotube weight and the exterior surface oxidized species content comprises more than about 0.1 to about 65 percent relative to carbon nanotube weight.

In one embodiment, the invention is a composition comprising a plurality of high-surface area carbon nanotubes, wherein at least a portion of the high-surface area carbon nanotubes are open ended, wherein the composition comprises a cathode, an anode, a binder material, an electrolyte material a separator film, or a composite material for an energy storage or collection device.

In another embodiment, the composition comprises a plurality of high-surface area carbon nanotubes in which at least a portion of the carbon nanotubes are open ended and ion conducting. The composition can further comprise at least one polymer. The polymer is selected from the group consisting of vinyl polymers, preferably poly(styrene-butadiene), partially or fully hydrogenated poly(styrene butadiene) containing copolymers, functionalized poly(styrene butadiene) copolymers such as carboxylated poly(styrene butadiene) and the like, poly(styrene-isoprene), poly(methacrylic acid), poly(acrylic acid), poly(vinylalcohols), and poly(vinylacetates), fluorinated polymers, preferably poly(vinylidine difluoride) and poly(vinylidene difluoride) copolymers, conductive polymers, preferably poly(acetylene), poly(phenylene), poly(pyrrole), and poly(acrylonitrile), polymers derived from natural sources, preferably alginates, polysaccharides, lignosulfonates, and cellulosic based materials, polyethers, polyolefins, polyesters, polyurethanes, and polyamides; homopolymers, graft, block or random co- or ter-polymers, and copolymers and mixtures thereof. Other polymers that may be employed include, for example, carboxymethyl cellulose or a salt thereof such as an alkali metal salt or an alkaline earth metal salt and in particular the sodium salt, cellulose-based polymers, hydrophilic polymers with aqueous solubility over 1% w/v, polystyrene sulfonate or a salt thereof such as an alkali metal salt or an alkaline earth metal salt and in particular the sodium salt. Hydrophilic polymers may be preferable in some embodiments.

In yet another embodiment of this invention, the plurality of high-surface area carbon nanotubes are further functionalized, preferably the functional group comprises a molecule of mass greater than 50 g/mole, and more preferably the functional group comprises carboxylate, hydroxyl, ester, ether, or amide moieties, or mixtures thereof.

A further embodiment of this invention comprising a plurality of high-surface area carbon nanotubes further comprising at least one dispersion aid.

In a yet further embodiment of this invention, the plurality of carbon nanotubes further comprise additional inorganic structures comprising of elements of the groups two through fourteen of the Periodic Table of Elements. These inorganic structures can be in the form of particles, layers or as continuous media. Preferred inorganic structures include electrically conducting inorganic structures such as, but not limited to, silver or copper, magnetic inorganic structures such as, but not limited to, iron oxide and low melting point inorganic structures such as, but not limited to, indium-tin alloys Another embodiment of this invention comprises a plurality of carbon wherein the composition has a flexural strength of at least about ten percent higher than a comparative composition made without the plurality of high-surface area carbon nanotubes.

Yet another embodiment of this invention is a cathode, an anode, a binder, electrolyte or separator film composition comprising a plurality of high-surface area carbon nanotubes having a portion of carbon nanotubes that are open ended and ion conducting. In some embodiments, the composition further comprises other carbon structures. The other carbon structures may comprise components selected from the group consisting of carbon black, graphite, graphene, oxidized graphene, fullerenes and mixtures thereof. Preferably the graphene or oxidized graphene have at least a portion of high-surface area carbon nanotubes interspersed between the graphene or oxidized graphene platelets.

A yet further embodiment of this invention is a composition comprising a plurality of high-surface area carbon nanotubes where the cathode, anode, or binder material has an impedance of less than or equal to about one billion ($1\times10^9$) ohm-m and the electrolyte material has a charge transfer resistance of less than or equal to about 10 million ($1\times10^7$) ohm-m.

Another embodiment of this invention comprises an electrolyte or separator film composition comprising a plurality of high-surface area carbon nanotubes wherein the carbon nanotubes are oriented. The orientation is accomplished by fabrication techniques such as in a sheet, micro-layer, microlayer with vertical film orientation, film, molding, extrusion, or fiber spinning fabrication method. The orientation may also be made via post fabrication methods, such as tentering, uniaxial orientation, biaxial orientation and thermoforming. The orientation may also be introduced by 3-D printing techniques. The oriented carbon nanotubes of this invention may be extracted from the oriented fiber or sheet containing the oriented carbon nanotubes by removal of the matrix material, such as, but not limited to, using a liquid solvent to dissolve a polymer matrix, acid to dissolve an inorganic matrix or degradation of the matrix by chemical means.

A further embodiment of this invention is a composition comprising a plurality of high-surface area carbon nanotubes wherein the portion of open ended tubes comprise electrolyte. For an electrolyte comprising polymer, the polymer is preferred to comprise a molecular weight of the polymer less than 10,000 daltons, such that the polymer can enter within the tube. The electrolyte may contain liquids.

An additional embodiment of this invention comprises a composition including a plurality of high-surface area carbon nanotubes, and wherein at least a portion of the high-surface area carbon nanotubes are open ended. The disclosed high-surface area nanotubes include increased length and diameter bundles wherein at least about 5% of the nanotubes have a portion of their outer surface exposed to the surrounding environment. Such high-surface area nanotubes include defribillated bundles. The bundles may have an average length of at least about 400 nm, about 800 nm, about about µm, about 10 µm, about 50 µm, about 100 µm, about 500 µm, about 1,000 µm, about 1,250 µm, about 1,400 µm, about 1,500 µm, about 1,600 µm, about 1,800 µm, about 2,000 µm, about 3,000 µm, or about 5,000 µm. Such bundles may have a diameter of about 1 µm, or about 3 µm, or about 5 µm, or about 7 µm, or about 8 µm, or about 9 µm, or about 10 µm, or about 12 µm. In preferred embodiments, the high-surface area carbon nanotubes are bundles of singled walled nanotubes with individual aspect ratios of at least about 50, at least about 100, at least about 300, at least about 500, at least about 700, at least about 900, at least about 1,000, at least about 1,200, at least about 1,500, or at least about 2,000, or at least about 3,000, or at least about 5,000, or at least about 10,000.

In statistics, a bimodal distribution is a continuous probability distribution with two different modes. These appear as distinct peaks (local maxima) in the probability density function. More generally, a multimodal distribution is a continuous probability distribution with two or more modes. The high-surface area carbon nanotubes can have a unimodal, bimodal or multimodal distribution of diameters and/or lengths both for the individual nanotubes which make up a high-surface area bundle and for the high-surface area bundles themselves. These compositions are useful in cathode materials, anode materials, binder materials, separator materials, and electrolytes of the invention.

In yet another embodiment, the invention is an electrode paste, preferably an anode paste, for a lead acid battery, the paste comprising high-surface area carbon nanotubes having an average length and/or high-surface area bundle length of at least about 1 µm, about 5 µm, about 10 µm, about 50 µm, about 100 µm, about 500 µm, about 1,000 µm, about 1,250 µm, about 1,400 µm, about 1,500 µm. The embodiment further comprising, dispersing aids such as, but not limited to, polyvinyl alcohol, water, lead oxide and/or sulfuric acid. Preferably, the carbon nanotubes, dispersing aid, and water form a dispersion, and the dispersion is then contacted with lead oxide followed by sulfuric acid to form the electrode paste of a lead acid battery, or other cathode or anaode materials to form other types of batteries. Other suitable solvents for aiding in the dispersion of carbon nanotubes include, for example, renewable solvents such as cyrene (Dihydrolevoglucosenone) or solvents such as glycols. The solvents may be miscible with, for example, deionized water.

Another embodiment of the invention is a composition consisting of high-surface area carbon nanotubes, wherein the high-surface area carbon nanotubes are coated with water, oils, waxes, nitric acid, or sulfuric acid. This coating reduces and/or prevents the formation of Van der Waals, electrical, or electrostatic forces between the carbon nanotubes, thereby reducing and/or preventing the high-surface area carbon nanotubes from agglomerating into a tight bundle, thereby reducing the exposed surface area of the carbon nanotubes, CNT.

In some embodiments, the composition may comprise as much as 99.99% composite material and as little as about 0.01% carbon nanotubes by weight, or as little as about 0.025% carbon nanotubes by weight. In other embodiments, the composition may contain as much as 2% carbon nanotubes (CNTs), or as much as 5% CNTs, or as much as 10% CNTs, or as much as 20% CNTs, or as much as 10% CNTs, or as much as 20% CNTs, or as much as 35% CNTs, or as much as 50% CNTs, or as much as 80% CNTs by weight. Removing the water or other coating material from the composite by drying could lead to the formation of anhydride, Van der Waals, electrostatic, or other bonds between the carbon nanotubes. The formation of these bonds could lead to the CNTs being difficult to disperse or re-agglomerating and ceasing to be high-surface area carbon nanotubes. Surprisingly, the use of surfactants may not be required in the formation of the disclosed compositions and thus there is little to no surfactant contained within the composition. This allows the incorporation of high-surface area carbon nanotubes into a matrix without the use of a surfactant which may reduce the connectivity or crosslinking of the matrix or otherwise interfere with the desired mechanical properties of the matrix.

The high-surface area carbon nanotubes of any composition embodiment above preferably comprise a plurality of open ended tubes, more preferably the plurality of high-surface area carbon nanotubes comprise a plurality of open ended tubes. The high-surface area carbon nanotubes of any composition embodiment above are especially preferred wherein the inner and outer surface oxidation difference is at least about 0.2 weight percent.

The high-surface area carbon nanotubes of any composition embodiment above preferably comprise a portion of carbon nanotubes that have a different amount of oxygen containing species than another portion. The high-surface area carbon nanotubes of any composition embodiment above are especially preferred wherein a portion of the carbon nanotubes differ from another portion of carbon nanotubes by at least about 0.2 weight percent.

The compositions described herein can be used as an ion transport. Various species or classes of compounds/drugs/chemicals which demonstrate this ion transport effect can be used, including ionic, some non-ionic compounds, hydrophobic or hydrophilic compounds. Ethers, carbonates and polyethers in electrolytes are known to help convey lithium ion species.

The new carbon nanotubes disclosed herein are also useful in ground water remediation.

The compositions comprising the novel high-surface area targeted oxidized carbon nanotubes can also be used as a component in, or as, a sensor.

The compositions disclosed herein can also be used as a component in, or as, drug delivery or controlled release formulations.

The compositions disclosed herein may be used as a structural scaffolding for catalysts. As discussed, catalysts, enzymes, proteins, peptides or other small or large molecules may be attached to the exterior of the disclosed carbon nanotubes. The disclosed nanotube scaffolding may be useful for positioning the attached catalysts within a matrix, positioning multiple catalytic proteins or molecules with respect to each other.

Magnetic particles may be bound or attached to the carbon nanotubes disclosed herein. The bound magnetic particles may be used to influence the orientation, location, or position of the carbon nanotube to which the magnetic particle is attached. Applying a magnetic field to carbon nanotubes bound to magnetic particles may allow the carbon nanotube to be moved to a particular location. Magnetic fields may be generated by natural magnets or electromagnetic devices including at least, MRI, fMRI, or pulsed electromagnetic field generator devices. Additionally, a single magnetic field generation device may be utilized or multiple magnetic field generation devices may be used. In some embodiments, an array of EMF generators may be used to move CNTs bound to magnetic particles and/or cause such CNTs to vibrate, rotate, oscillate, or to direct CNTs from one specific position to another.

More than one species of magnetic particle may be bound to a single carbon nanotube. In some embodiments, the distinct species of magnetic particle may behave differently in the same magnetic field, thus creating an increased variety of possibilities for impacting the behavior of carbon nanotubes attached to more than one species of magnetic particle.

Magnetic particles bound to carbon nanotubes may comprise approximately 0.001 weight percent relative to carbon nanotube weight, or may comprise approximately 0.01 weight percent relative to carbon nanotube weight, or may comprise approximately 0.1 weight percent relative to carbon nanotube weight, or may comprise approximately 1 weight percent relative to carbon nanotube weight, or may comprise approximately 10 weight percent relative to carbon nanotube weight, or may comprise approximately up to 50 weight percent relative to carbon nanotube weight, or may comprise up to approximately 90 weight percent relative to carbon nanotube weight.

Carbon nanotubes bound to magnetic particles may additionally contain a payload molecule as discussed above or have peptides, small molecules, nucleic acids, or other drugs or molecules attached to their exterior. These combinations may allow the nanotube, along with its associated payload or substantially non-magnetic attached molecule to be directed to a particular location where the payload molecule of the attached molecule may be desired. In this manner, targeted molecules could be delivered to a particular location using a controlled magnetic field.

In some embodiments, magnetic fields may be used in order to flex or distort carbon nanotubes or a network, matrix, or scaffold of carbon nanotubes. If an open ended, payload carrying nanotube is flexed or distorted as described, this may increase the rate at which the interior payload molecule is emptied into the surrounding environment thereby enabling the controlled, targeted, and/or timed release of payload molecules. Similarly, the described flexing of a network of carbon nanotubes may increase the rate at which payload molecules are loaded into the interior of open ended nanotubes or allow molecules to be entrapped within the interior spaces of the nanotube network itself while remaining external to any particular nanotube.

Batteries comprising the compositions disclosed herein are also useful. Such batteries include lithium, nickel cadmium, or lead acid types.

Formulations comprising the compositions disclosed herein can further comprise molecules comprising an epoxide moiety (moiety may also be referred to as chemical group), or a urethane moiety, or an ether moiety, or an amide moiety, an alkane moiety, or a vinyl moiety. The molecules may be in a rigid or elastomeric or fluid state at room temperature. Such formulations can be in the form of a dispersion. The formulations can also include nanoplate structures.

The compositions can further comprise at least one hydrophobic material in contact with at least one interior surface.

The present invention relates to a composition comprising a plurality of high-surface area carbon nanotubes and a plasticizer wherein the high-surface area carbon nanotubes can be functionalized with oxygen containing species on their outermost wall surface. One group of high-surface area carbon nanotubes comprise an interior and exterior surface, each surface comprising an interior surface and exterior surface oxidized species content wherein the interior surface oxidized species content comprises from about 0.01 to less than about 1 percent relative to carbon nanotube weight and the exterior surface oxidized species content comprises more than about 1 to about 3 percent relative to carbon nanotube weight. The oxygen species can comprise carboxylic acids, phenols, ketones, lactones, or combinations thereof.

The composition can further comprise a plasticizer selected from the group consisting of dicarboxylic/tricarboxylic esters, timellitates, adipates, sebacates, maleates, glycols and polyethers, polymeric plasticizers, bio-based plasticizers and mixtures thereof. The composition can comprise plasticizers comprising a process oil selected from the group consisting of naphthenic oils, paraffin oils, paraben oils, aromatic oils, vegetable oils, seed oils, and mixtures thereof.

The composition can further comprise a plasticizer selected from the group of water immiscible solvents consisting of but not limited to xylene, pentane, methylethyl ketone, hexane, heptane, ethyl acetate, ethers, diclorometh-ane, dichloroethane, cyclohexane, chloroform, carbon tetrachloride, butyl acetate butanol, benzene, cresol or mixtures thereof.

In yet another embodiment the composition is further comprises an inorganic filler selected from the group consisting of silica, nano-clays, carbon black, graphene, glass fibers, and mixtures thereof.

In another embodiment the composition is in the form of free flowing particles.

In another embodiment, the composition comprises a plurality of high-surface area carbon nanotubes and a plasticizer wherein the high-surface area carbon nanotubes comprise from about 10 weight percent to about 90 weight percent, preferably 10 weight percent to 40 weight percent, most preferably 10 to 20 weight percent.

Another embodiment is the composition of high-surface area carbon nanotubes in a plasticizer further mixed with a least one rubber. The rubber can be natural or synthetic rubbers and is preferably selected from the from the group consisting of natural rubbers, polyisobutylene, polybutadiene and styrene-butadiene rubber, butyl rubber, polyisoprene, styrene-isoprene rubbers, styrene-isoprene rubbers, ethylene, propylene diene rubbers, silicones, polyurethanes, polyester-polyethers, hydrogenated and non-hydrogenated nitrile rubbers, halogen modified elastomers, flouro-elastomers, and combinations thereof.

Another embodiment is the composition of high-surface area carbon nanotubes in a plasticizer further mixed with at least one thermoplastic polymer or at least one thermoplastic elastomer. The thermoplastic can be selected from but is not limited to acrylics, polyamides, polyethylenes, polystyrenes, polycarbonates, methacrylics, phenols, polypropylene, polyolefins, such as polyolefin plastomers and elastomers, EPDM, and copolymers of ethylene, propylene and functional monomers.

Yet another embodiment is the composition of high-surface area carbon nanotubes in a plasticizer further mixed with at least one thermoset polymer, preferably an epoxy, or a polyurethane. The thermoset polymers can be selected from but is not limited to epoxy, polyurethane, or unsaturated polyester resins.

General Process to Produce High-Surface Area Carbon Nanotubes Having Targeted Oxidation Disclosed are embodiments of compositions containing high-surface area carbon nanotubes for the improved performance of energy storage devices, including, but not limited to lithium ion battery technology. In some disclosed embodiments, single layer pouch cells in silicon containing anodes show tremendous cycle life improvement when carbon nanotubes such as produced by OCSiAl single wall carbon nanotubes (SWNTs) are treated according to the disclosed processes to create high-surface area single wall carbon nanotubes. Other manufacturers of carbon nanotubes that may be suitable for use in the applications described herein include, for example, Southwest Nanotechnologies, Zeonano or Zeon, CNano Technology, Nanocyl, ACS Materials, American Elements, Chasm Technologies, Haoxin Technology, Hanwha Nanotech Group, Hyperion Catalysis, KH Chemical, Klean Commodities, LG Chem, Nano-C, NTP Shenzhen Nanotech Port, Nikkiso, Raymor, Saratoga Energy, SK Global, Solid Carbon Products, Sigma Aldrich, Sun Nanotech, Thomas Swan, TimesNano, Tokyo Chemical Industry, XF Nano, and OCSiAl.

The data below shows details of both the oxidation process and the subsequent shearing or disruptive force treatment of the tubes. During shearing, samples may be subjected to intensely disruptive forces generated by shear (turbulent) and/or cavitation with process equipment capable of producing energy densities as high as of $10^6$ to $10^8$ Joules/$m^3$. Equipment that meets this specification includes but is not limited to ultrasonicators, cavitators, mechanical homogenizers, pressure homogenizers and microfluidizers (Table 3). One such homogenizer is shown in U.S. Pat. No. 756,953, the disclosure of which is incorporated herein by reference. Additional shearing equipment includes, but is not limited to, HAAKE™ mixers, Brabender mixers, Omni mixers, Silverson mixers, Gaullin homogenizers, and/or twin-screw extruders. After shear processing, the carbon nanotubes bundles have been loosened, thereby exposing the surface of a greater number of nanotubes and/or a greater portion of the surface of the nanotubes to the surrounding environment. Typically, based on a given starting amount of entangled as-received and as-made carbon nanotubes, a plurality of high-surface area oxidized carbon nanotubes results from this process, preferably at least about 60%, more preferably at least about 75%, most preferably at least about 95% and as high as 100%, with the minority of the tubes, usually the vast minority of the tubes remaining tightly bundled and with the surface of such tightly bundled nanotubes substantially inaccessible.

Example 1—Oxidizing Tuball™ (OCSiAl)

Thirty-five grams of >64% nitric acid is heated to 95 degrees C. To the acid, 15 grams of as-received, single-walled carbon nanotubes (Tuball™) are added. The as-received tubes have the morphology of tightly bundled tree-trunks. The mixture of acid and carbon nanotubes are mixed while the solution is kept at about 95 degrees Celsius for 5 hours and is labeled "oSWCNT-82-2". At the end of the reaction period, the oSWCNT 82-2 are filtered to remove the acid and washed with reverse osmosis (RO) water to pH of 3-4. The resulting CNTs were oxidized to about 3.6% and contained about 4.4% metal residue.

Variations on this process were also conducted using slightly differing parameters as shown below in Table 1:

Samples oxidized by an acid process: e.g. 35 g $HNO_3$ (65%)/15 g Tuball™, 95° C. oxidation.

23.33 g $HNO_3$ (65%)+10.01 g CNT. T=95° C. Initial big plume of NOx at addition of CNT.

TABLE 1

| Time (hr) | T (° C.) | % Ox | % Res |
|---|---|---|---|
| 0 | 94.2 | 1.11 | 21.7 |
| 1 | 95.6 | 2.5 | |
| 2 | 95.6 | 2.4 | 4.5 |
| 3 | 95.6 | 2.4 | 4.9 |
| 4 | 96.2 | 2.3 | 5.4 |
| 5 (82-final) | 95.6 | 3.6 | 4.4 |

The samples were washed to pH 3.6. 25.17 g recovered @27.1% solids
Sample 82-2
34.98 g $HNO_3$, 15 g Tuball™

TABLE 2

| Time (hr) | T (° C.) | % Ox | % Res |
|---|---|---|---|
| 0.5 | 96.2 | 2.6 | 5.5 |
| 1 | 95.9 | 2.4 | 5.6 |
| 2 | 95.9 | 2.8 | 5.3 |
| 3 | 93.2 | 2.4 | 4.9 |
| 4 | 94.2 | 2.4 | 5.6 |
| 5 | 93.9 | 2.5 | 7.0 |

Washed to pH 3.75, 37.26 g recovered at 27.5% solids
Sample 82-3
23.3 g $HNO_3$, 10 g Tuball™ CNT. 5 hr oxidation=2.5% Ox, 9.95% Residue, 20.2% solids. 31 g recovered @ 20.2% solids.

Example 2—Shear Treatment of Non-Oxidized and Oxidized OCSiAl Tubes

Example 2A—Shear Treatment of Oxidized OCSiAl Tubes

Sample volume ~1200 mL. Use 1.5 L stainless steel container for Rotor/Stator (R/S) work.
Oxidized OCSiAl ~0.15%
Oxidized OCSiAl source: 82-final (pH 3.61, 27.1% solids)
1200 g×0.15%=1.8 g dry equiv.=6.64 g wetcake. Used 6.65 g wetcake.

Check viscosity through Rotor Stator (R/S) as shown below.

| T (min) | T (° C.) | Comments |
|---|---|---|
| 0 | 23 | |
| 5 | 31 | Clear liquid droplets on plastic covering vessel opening. Not viscous |
| 9 | 41 | Clear liquid droplets on plastic covering vessel opening. Not viscous + 6.62 g wetcake |
| 15 | 50 | Viscous mixture. Proceed to shearing |

Place in Freezer for ~1.5 hr.
Shearing

| Pass # | T (° C.) | Comments |
|---|---|---|
| 1 | 25 | 1500 psi because noticed some large particles present when cleaning the rotor stator |
| 2 | 36 | |
| 3 | 42 | Place in freezer 45 minutes → 15° C. |
| 4 | 31 | |
| 5 | 37 | |
| 6 | 45 | |
| 7 | 51 | 1 hr freezer → 25° C. |
| 8 | 39 | Sample for optical microscopy |

Sample name 180417-MF-1A (0.26% solids), 180417-MF-1B (0.22% solids) ~19 g.

Optical Microscopy, shown in FIG. 1, shows a progression from wetcake to rotor shearing 8 cycles shearing with a high shear rate mixer. R/S performs the initial breakup of the bundles and this is significantly furthered by passing through a shearing device. The experimental results described throughout are expected to be obtainable using multiple shearing devices including those described in Table 3 as well as HAAKE™ mixers, Brabender mixers, Omni mixers, Silverson mixers, Gaullin homogenizers, and/or twin-screw extruders and/or the Netzch Omega® Economic Dispersionionizer and/or the Sonolator from Sonic Corp.

TABLE 3

| Homogenizer Type | Flow Regime | Energy Density ($J \cdot m^{-3}$) |
|---|---|---|
| Stirred tanks | turbulent inertial, turbulent viscous, laminar viscous | $10^3$-$10^6$ |
| Colloid mil | laminar viscous, turbulent viscous | $10^3$-$10^8$ |
| Toothed - disc disperser | turbulent viscous | $10^3$-$10^8$ |
| High pressure homogenizer | turbulent inertial, turbulent viscous, cavitation inertial, laminar viscous | $10^6$-$10^8$ |
| Ultrasonic probe | cavitation inertial | $10^6$-$10^8$ |
| Ultrasonic jet | cavitation inertial | $10^6$-$10^8$ |
| Microfluidization | turbulent inertial, turbulent viscous | $10^6$-$10^8$ |
| Membrane and microchannel | Injection spontaneous transformation based | Low $10^3$ |

Excerpted from Engineering Aspects of Food Emulsification and Homogenization, ed. M Rayner and P. Dejmek, CRC Press, New York 2015.

Example 2B—Shear Treatment of Unmodified OCSiAl 600 mL@0.4% solids=2.4 g OCSiAl.
OCSiAl source: TUBALL' single wall carbon nanotubes. Batch number 01RW01.N1.257 production date: 20 Dec. 2016.

Rotor/Stator—Conducted in 800 mL plastic container in an ice bath.

| t (min) | T (° C.) | Comments |
|---|---|---|
| 0 | 21 | |
| 5 | 48 | Higher viscosity than oxidized OCSiAl .3% |
| 10 | 65 | Place in freezer to cool prior to shearing for 50 minutes. This brings the temperature to 27° C. |

Shearing Treatment:

| Pass # | T (° C.) | Comments |
|---|---|---|
| 0 | 27 | 2000 psi to allow larger particles to pass. |
| 1 | 36 | 8000 psi |
| 2 | 36 | |
| 3 | 38 | |
| 4 | 41 | |
| 5 | 43-48 | 43 top, 48 at bottom of container. Use this higher number. 11:15 AM place in freezer |
| 6 | 29 | |
| 7 | 32-38 | 32 top, 38 bottom of container. |
| 8 | 44 | |

Sample 180418-MF-1. Measured 0.34% solids (17 g sample size) ~500 g sample recovered.

Example 2C—Oxidized OCSiAl/MA 14 Through Shearing Device

An 80/20 ratio of MA 14/oxidized OCSiAl was prepared. This was conducted by taking the wetcake of both of these components and passing them through the rotor stator followed by shear treatment. Thus, the oxidized OCSiAl is being broken up at the same time the o-CNT is being converted to Molecular Rebar® in order to give further improvements in lithium ion battery performance.

600 mL sample size, 1.5% MR. Molecular Rebar® source MA-14 (12.95% solids).

Oxidized OCSiAl ("82-final", 27.1% solids)

600×0.015=9 g/0.1295=69.498 g MA 14.

0.8 g MA-14/0.02 g oxidized OCSiAl=9 g MA-14/0.225 g Oxidized OCSiAl.

0.225 g oxidized OCSiAl=0.225/0.271=0.83 g 82-final.

Rotor stator treatment:

| time (min) | T (° C.) | Comments |
|---|---|---|
| 0 | 21 | |
| 5 | 45 | |
| 10 | 62 | → Freezer 40 minutes |

Shearing Treatment:

| Pass # | T (° C.) | Comments |
|---|---|---|
| 0 | 26 | 2000 psi to allow larger particles to pass. |
| 1 | 32 | 8000 psi |
| 2 | 37 | Very viscous - extrudes as rope. Add ~30 ml H2O |
| 3 | 33 | |
| 4 | 39 | |
| 5 | 45 | |
| 6 | 47 | |
| 7 | 48 | → Freezer 30 min |
| 8 | 36 | Add H2O at end for material recovery in tube supply/exit line |

Sample=180419-MF-1. 730 g collected. 1.12% Solids.

Example 3—Performance in Li Ion Battery Pouch Cells

The oxidized and non-oxidized OCSiAl cells were formed into Li ion battery single layer pouch cells—cell details below:

NCM523 Cathode//Anode

Figure 2:
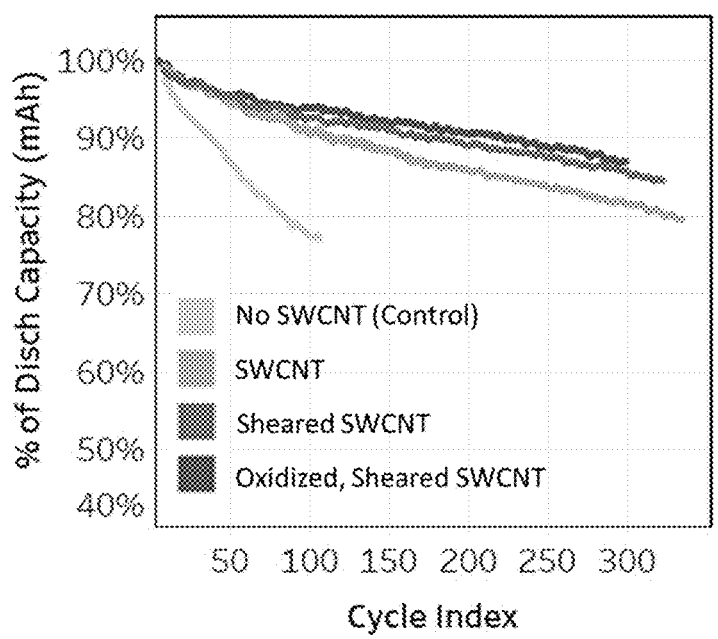
FIG. 2 shows the effect of oxidation and processing on capacity vs. cycle.

Anode Details:

20% SiOx+71% Graphite+1% CMC+1.5% SBR+1% C65+noted % XP in FIG. 2.

Loading: ~10 mg/cm$^2$

Cathode Loading: 4.2 mAh/cm$^2$

Separator: Glass fiber—Whatmann GF/F

Housing: 40 mAh Single layer Pouch

FIG. 2 shows a comparison of a control vs. OcSiAl Tuball™ Batt product (PVP dispersion) vs. the effect of oxidation and processing (shearing, sonication, etc.).

The control (no carbon nanotubes) shows very low cycle life. End of cycle life in the industry is generally regarded as the point at which the capacity has faded to 80% of the original capacity—i.e., the cell can now only be charged to 80% of its initial capacity—it will not accept any more charge. The reasons are many, but in silicon based anodes, the major culprit is loss of electrical connectivity is due to cracking of the silicon particles which swell upon charging (they get loaded with Lithium from the cathode) and discharging (Li moves back to the cathode). When the silicon particles swell they push the graphite particles closer together but these do not move back upon de-swell resulting in gaps and particles that are now electrically isolated.

Putting the OCSiAl through a shearing treatment clearly improves the cycle life vs. unprocessed OCSiAl. Further improvements are achieved with oxidation and shearing. This is due to the fibrillation and increased surface area which can span the gaps described above. With fibrillation there are more connected particles vs. non-fibrillated.

Figure 3:
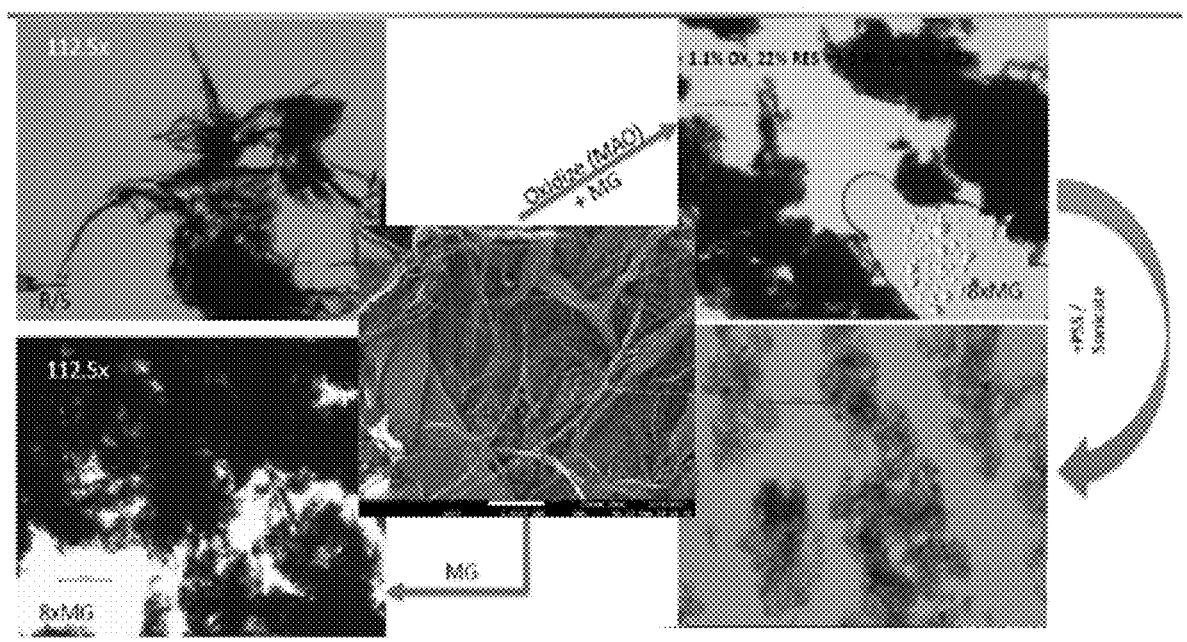
FIG. 3 shows optical micrographs of various compositions.

FIG. 3 shows Optical Microscopy (all images at ~same magnification). The center electron micrograph shows the "as received" OCSiAl dry powder. It is a ribbon or tree trunk type structure with a very small amount of fibrillation and low surface area. In this structure the majority of the tubes surface area is not exposed as it is protected by surrounding tubes. The top left image shows effect of putting a dilute (~0.15%) solution in water through a rotor/stator at 9900 rpm for 10 minutes. Clearly this process has some effect on breaking up the ribbons and causing some level of fibrillation thus increasing the surface area (SA).

The bottom left image of FIG. 3 shows effect of putting the above material through a shear treatment—further increasing the fibrillation and thus increasing the exposed surface area. Top right shows oxidized OCSiAl through the shearing treatment—again increasing the fibrillation and thus surface area. Oxidation introduces functionality to the material and significantly reduces the amount of residual metal contamination. Bottom right shows the effect of adding surfactant to the oxidized sheared material followed by sonication. Sonication resulted in further increase in fibrillation and surface area.

Figure 4A:
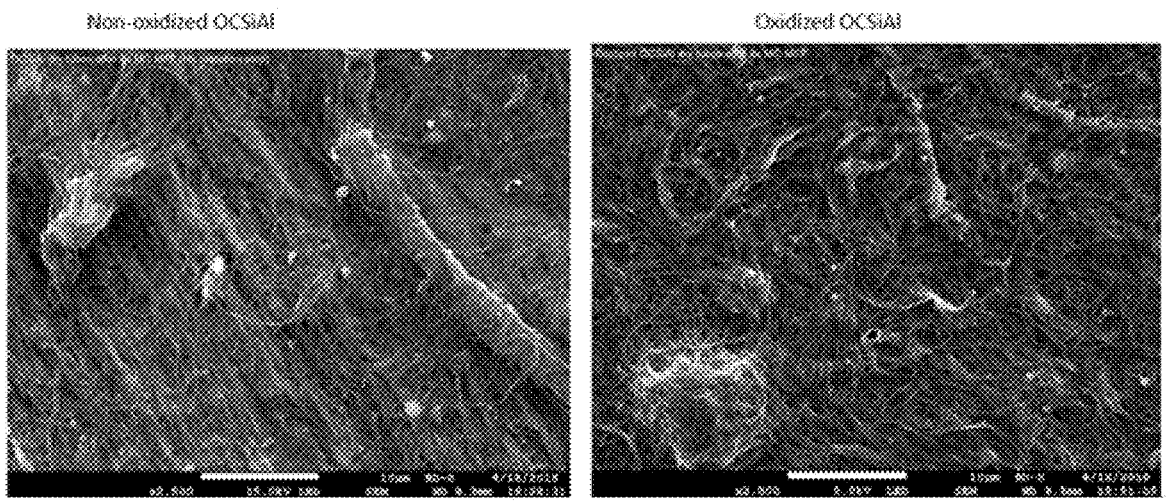
FIGS. 4A and 4B are micrographs showing the effect of shear.
Figure 4B:
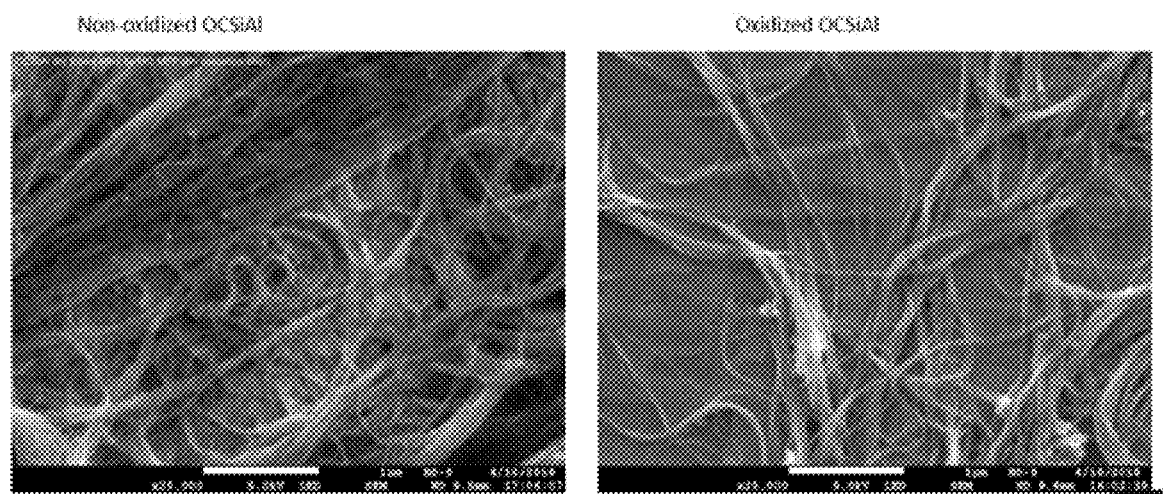

FIGS. 4A and 4B, electron micrographs show side by side comparisons of unoxidized vs. oxidized shear treated OCSiAl. FIG. 4A shows 2,500× magnification while FIG. 4B shows 25,000× magnification. Both levels of magnification show significantly more fibrillation for the oxidized vs. non-oxidized sheared materials.

Figure 5:
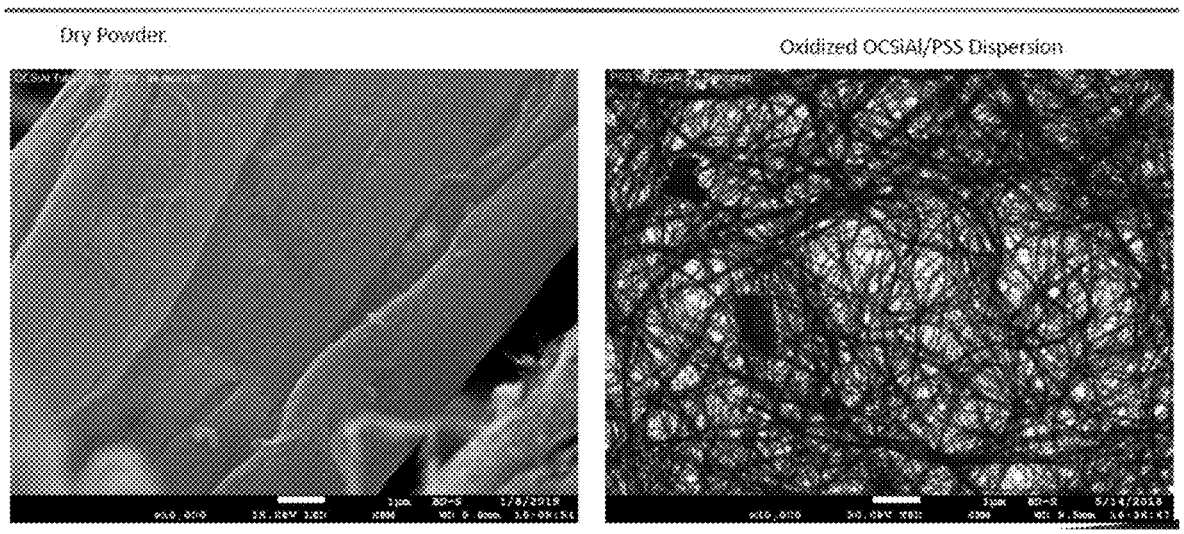
FIG. 5 shows micrographs of dry powder vs. a specific dispersion.
Figure 7:
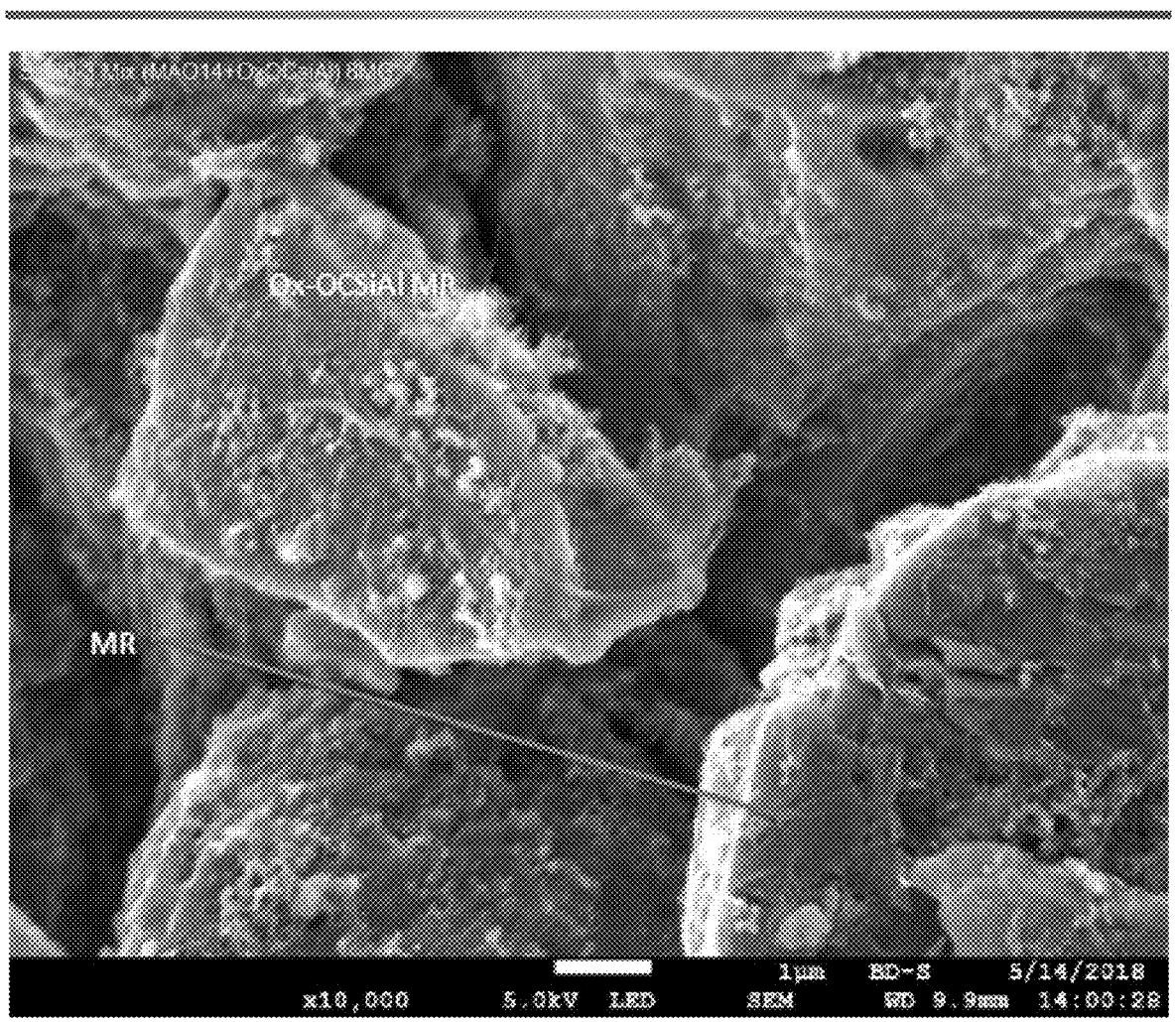
FIG. 7 shows a micrograph of a mixture.

FIG. 5 shows a comparison of dry powder OCSiAl vs. PSS (polystyrene sulfonate) dispersion of oxidized OCSiAl but, as shown in FIG. 7, MR particles cover the surface of the SiOx in a "cage type" structure. The oxidized OCSiAl structures are capable of having electroactive material, e.g. Li attached to the functional groups. Electroactive materials include, but are not limited to, graphite, lithium cobalt oxide, lithium iron phosphate, and/or lithium manganese oxide.

Example 4—Electrical Property Testing

Shown in Tables 4 and 5 below is a summary of the readings gathered using a parallel plate apparatus.

TABLE 4

| Sample | | 4.12N load | | | 2.16N Load | | |
|---|---|---|---|---|---|---|---|
| | | Reading ($\Omega$) | Ave ($\Omega$) | SEM ($\Omega$) | Reading ($\Omega$) | Ave ($\Omega$) | SEM ($\Omega$) |
| Bare Cu plates | | 0.0048 | 0.0054 | 0.0006 | 0.0106 | 0.0139 | 0.0017 |
| | | 0.0066 | | | 0.0154 | | |
| | | 0.0048 | | | 0.0157 | | |
| Cu with 2 sided C coat | | 0.971 | 1.083 | 0.172 | 2.315 | 2.045 | 0.188 |
| | | 1.420 | | | 2.138 | | |
| | | 0.857 | | | 1.683 | | |
| Cu with 1 sided C coat | | 0.792 | 0.822 | 0.025 | 0.945 | 1.064 | 0.060 |
| | | 0.872 | | | 1.106 | | |
| | | 0.803 | | | 1.140 | | |
| Cu foil (no C coat) | | 0.272 | 0.478 | 0.128 | 0.808 | 0.879 | 0.042 |
| | | 0.450 | | | 0.874 | | |
| | | 0.712 | | | 0.954 | | |
| Si080-1 | non-Calendered | 1.786 | 1.493 | 0.149 | 2.141 | 1.865 | 0.149 |
| | | 1.296 | | | 1.63 | | |
| | | 1.398 | | | 1.824 | | |
| | Calendered | 0.728 | 0.669 | 0.025 | 0.816 | 0.803 | 0.046 |
| | | 0.642 | | | 0.847 | | |
| | | 0.616 | | | 0.879 | | |
| | | 0.688 | | | 0.671 | | |
| Si080-2 | non-Calendered | 1.425 | 1.464 | 0.044 | 1.932 | 1.959 | 0.108 |
| | | 1.414 | | | 1.788 | | |
| | | 1.552 | | | 2.158 | | |
| | Calendered | 1.043 | 0.889 | 0.059 | 1.276 | 1.130 | 0.095 |
| | | 0.789 | | | 0.863 | | |
| | | 0.802 | | | 1.254 | | |
| | | 0.922 | | | 1.127 | | |
| Si080-3 | non-Calendered | 1.606 | 1.597 | 0.023 | 1.972 | 2.160 | 0.095 |
| | | 1.553 | | | 2.282 | | |
| | | 1.633 | | | 2.226 | | |
| | Calendered | 0.895 | 1.381 | 0.199 | 1.068 | 2.057 | 0.365 |
| | | 1.854 | | | 2.821 | | |
| | | 1.472 | | | 2.092 | | |
| | | 1.301 | | | 2.247 | | |
| Si080-4 | non-Calendered | 1.732 | 1.719 | 0.015 | 2.515 | 2.358 | 0.089 |
| | | 1.735 | | | 2.353 | | |
| | | 1.689 | | | 2.206 | | |
| | Calendered | 1.239 | 1.317 | 0.075 | 2.085 | 1.981 | 0.063 |
| | | 1.278 | | | 1.857 | | |
| | | 1.212 | | | 1.889 | | |
| | | 1.539 | | | 2.093 | | |

Figure 6:
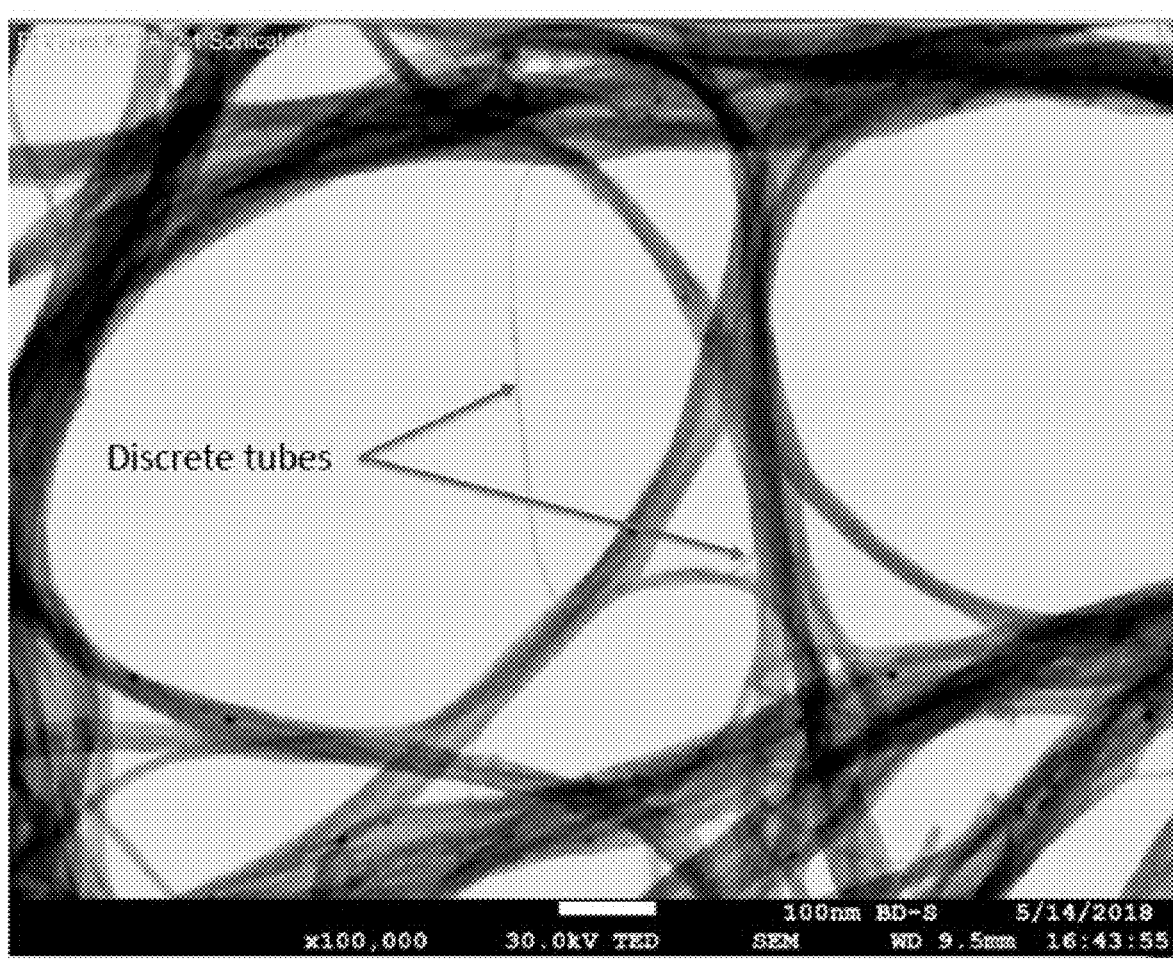
FIG. 6 shows a micrograph of defibrillated ribbons.

FIG. 6 shows that it is possible to get the ribbons defibrillated down to single tubes in some instances.

FIG. 7, an electron micrograph, shows oxidized carbon nanotubes and O—OCSiAl mixed and put through a shearing treatment together to make intimate Molecular Rebar® (MR) mixture. This micrograph shows a synergy in that the MR forms a coating on the silicon oxide SiOx particles and interacts intimately with the carbon black while the "tree trunk" Ox-OCSiAl MR is long enough to span the length of the SiOx particle and is long enough to span the gaps that are too large for MR to bridge. FIG. 7 shows the tree trunk covering the entire length of the SiOx particle. Such lengths are easily capable of spanning the gaps between SiOx and graphite. MR particles may be too short to accomplish this

TABLE 5

| Si080-180424-1 | 8× Sheared OxOscial (Sheared) | 0.669 ohms |
| Si080-180424-2 | 8× Sheared Oscial (Non-Ox) (Sheared) | 0.889 ohms |
| Si080-180424-3 | Std + 0.8% Sheared oCNT + 0.02% Tuball ™ | 1.381 ohms |
| Si080-180424-4 | 0.025% Tuball ™ Dispersion | 1.317 ohms |

As can be seen in the data of Tables 4 and 5, the oxidized samples show lower resistance.

Example 5—BET Surface Area Measurement

BET surface area was measured using $N_2$ BET isotherms according to ASTM D6556-16 and the results are provided below.

| Sample | BET Surface Area (m²/g) |
|---|---|
| OCSiAl SWCNT as received | 479.6 |
| OCSiAl SWCNT processed following Example 2 | 757.4 |
| OCSiAl SWCNT oxidized following Example 1 and then processed following Example 2 | 1081.4 |

Example 6—High Purity OCSiAl Tuball SWCNT Through Shearing Device

Figure 8:
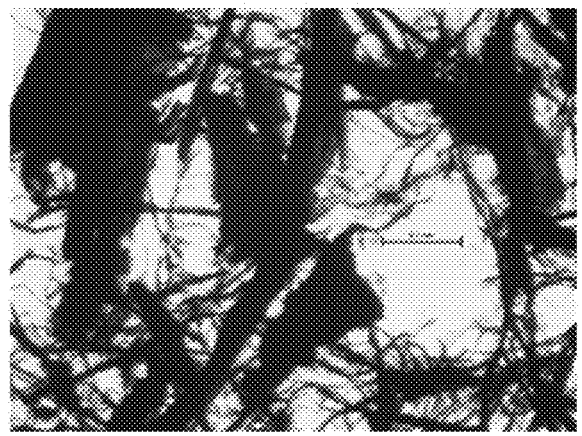
FIG. 8 shows Example 6 nanotubes before shearing.
Figure 9:
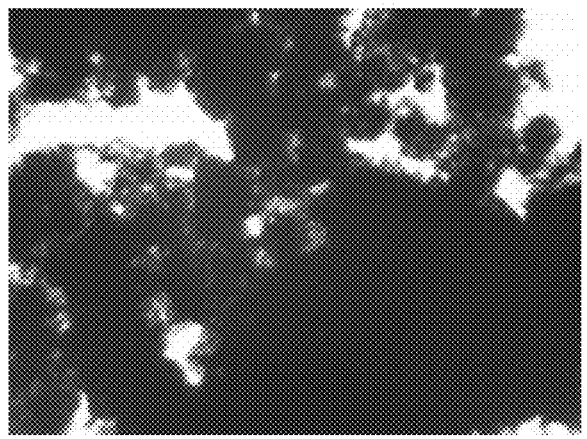
FIG. 9 shows Example 6 nanotubes after shearing.

High purity OCSiAl SWCNT was determined by TGA analysis to have 1.3% oxidation level and 0.6% residuals (metallic impurities) compared to low purity OCSiAl SWCNT which has 0.6% oxidation level and 17.7% Residuals as received. A sample of 2.8 g of high purity OCSiAl SWCNT was diluted with deionized water to 650 g total (0.43% solids) and subjected to 10 minutes of processing using a Rotor Stator. This material was then subjected to shearing force at 2000 psi for a single pass through the device. The pressure was increased to 8000 psi and passed through the shear device an additional 8 times. Optical images after the Rotor Stator vs. the shearing are shown in FIG. 8 which shows high purity OCSiAl SWCNT before shearing and FIG. 9 which shows the high purity OCSiAl SWCNT after extensive shearing. Both FIGS. 8 and 9 are at 112.5× magnification.

Example 7—Oxidation of High Purity OCSiAl Tuball SWCNT

A total of 15 grams of high purity grade OCSiAl SWCNT was added to 35 grams of 65% aqueous nitric acid and heated at 90° C. in a round bottom flask connected to a condenser cooled by deionized water for 5 hours. At 30 minutes and every hour a sample was taken from the flask, washed with deionized water to pH 3.9, and dried. The sample was then analyzed by TGA for oxidation level and residue (metallic impurities.) The results are given in the table below.

Table of TGA results for high purity OCSiAl Tuball SWCNT after oxidation

| Time, Hrs | Oxidation, % | Residue % |
|---|---|---|
| 0.5 | 1.4 | 0.8 |
| 1 | 1.6 | 0.5 |
| 2 | 1.2 | 0.7 |
| 4 | 1.2 | 0.8 |
| 5 | 1.4 | 0.8 |
| Final | 2.0 | 1.0 |

Following the same procedure, a series of different SWCNTs were oxidized, and the oxidation level and residue determined by the same TGA procedure. The starting materials prior to oxidation were also evaluated. The results of these experiments are given in the table below.

Oxidation level and residue level of various SWCNTs before and after oxidation treatment

| Material | % Ox. Range | % Residue Range |
|---|---|---|
| Non-Oxidized 75% purity OCSiAl | 0.9-1.2 | 19-22 |
| Oxidized 75% Purity OCSiAl | 2.3-3.7 | 4.6-10 |
| Non-Oxidized high purity OCSiAl | 1.3-1.4 | 0.6 |
| Oxidized high purity OCSiAl | 2.0 | 1.0 |
| Non-Oxidized Zeon (Aldrich Zeonano) | 0.02 | 1.8 |
| Oxidized Zeon (Aldrich Zeonano) | 4.9 | 0.2 |
| Non-Oxidized Thomas Swan SWCNT (Elicarb) | 1.9 | 2.2 |
| Oxidized Thomas Swan SWCNT (Elicarb) | 3.5 | 1.4 |

Figure 10:
FIG. 10 shows Example 8 nanotubes before shearing.
Figure 11:
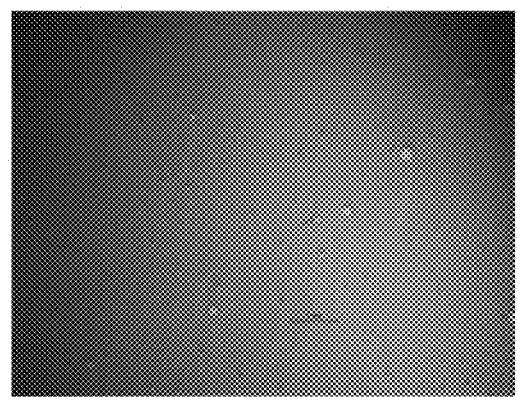
FIG. 11 shows Example 8 nanotubes after shearing.

Example 8—Aqueous Dispersion of High Purity OCSiAl Tuball SWCNT and Sodium Carboxymethyl Cellulose A total of 2 grams of high purity OCSiAl Tuball SWCNT was diluted to 0.4% solids with deionized water. The mixture was subjected to Rotor Stator processing for 5 minutes at 10,000 rpm. The sample was diluted to 0.2% and sheared for 2 passes through the shearing device at 8500-9000 psi. At that point, 105 grams of 3.79% solids Walocel CRT 30 PA sodium carboxymethylcellulose (CMC) in deionized water was added. The mixture was then passed through the shearing device for another 8 passes while keeping the temperature of the mixture below 40° C. Optical microscopy of the SWCNT through the Rotor Stator compared to the final dispersion are shown in FIGS. 10-11. FIG. 10 shows high purity OCSiAl Tuball SWCNT before shearing and FIG. 11 shows high purity OCSiAl Tuball SWCNT after shearing device and addition of CMC. Both are at 11.25× magnification. The lack of any apparent particles in the optical image after dispersion means the fibrils are less than 1 millimeter in size (scale bar is 1 millimeter.).

Figure 12:
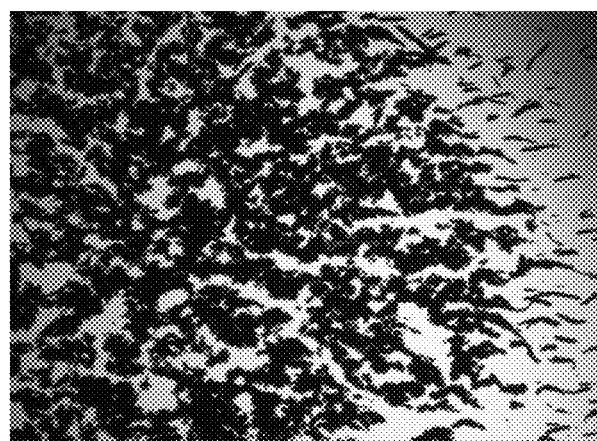
FIG. 12 shows Example 9 nanotubes before shearing.
Figure 13:
FIG. 13 shows Example 9 nanotubes after shearing.

Example 9—Aqueous Dispersion of Oxidized Zeonano SWCNT and Sodium Carboxymethyl Cellulose An aqueous mixture of 0.77% oxidized Zeonano SWCNT in deionized water was processed using a Rotor Stator for 25 minutes at 10,000 rpm. The oxidation was previously described. The mixture was maintained at 27-31° C. during processing. The material was diluted to 0.17% solids. The mixture was passed through a shear device 5 times. The first pass was sheared at 6000 psi and the subsequent passes at 8000-9000 psi. The pH was adjusted to pH 7 after pass 4. After pass 5, Walocel CRT 30 PA sodium carboxymethyl cellulose (CMC) was added in a mass ratio of 1 SWCNT to 1 CMC. The mixture was then passed through the shearing device at 8000-9000 psi for an additional 11 passes while maintaining the temperature of the mixture below 40° C. At pass 14, additional surfactant was added to give a ratio of 1 SWCNT to 2.25 CMC. At pass 16, additional surfactant was added to give a ratio of 1 SWCNT to 2.75 CMC. FIG. 12 shows Oxidized Zeonano SWCNT before shearing and FIG. 13 shows it after shearing device and addition of CMC (11.25× magnification).

Figure 14:
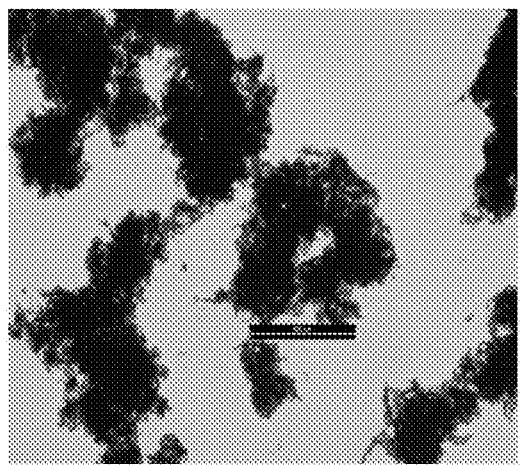
FIG. 14 shows Example 10 nanotubes before shearing.
Figure 15:
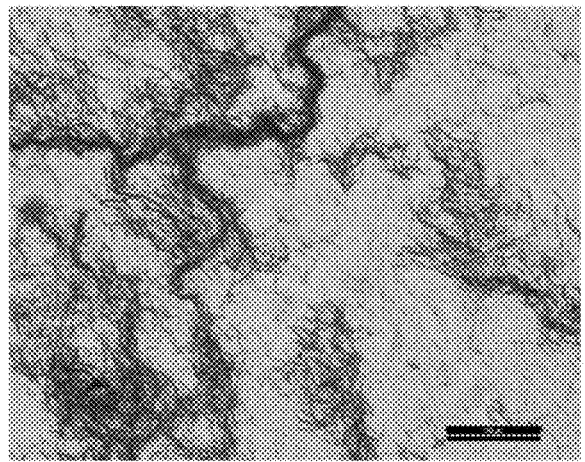
FIG. 15 shows Example 10 nanotubes after shearing.

Example 10—Aqueous Dispersion of Un-Oxidized Zeonano SWCNT and Sodium Carboxymethyl Cellulose A total of 2 grams of un-oxidized, as-received Zeonano SWCNT was mixed with 698 grams of deionized water and processed for 20 minutes using a Rotor Stator at 10,000 rpm. An additional 195 of deionized water was then added. The mixture was passed through the shear device 6 times at 8000-9000 psi. A total of 105.8 grams of 3.78% solids solution of Walocel CRT 30 PA sodium carboxymethyl cellulose was then added to the mixture. The mixture was then passed through the shear device an additional 14 times while maintaining the mixture temperature below 40° C. FIG. 14 shows Un-oxidized Zeonano SWCNT after 5 passes through shearing device (35× magnification) and FIG. 15 shows it after 20 passes through shearing device and addition of CMC (140× magnification)

Example 11—Dispersion of High Purity OCSiAl in Cyrene

Figure 16:
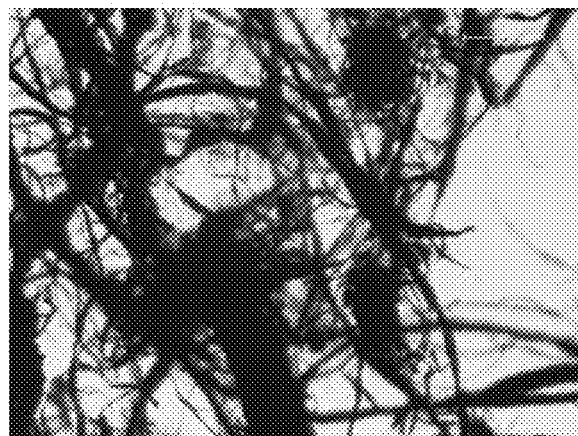
FIG. 16 shows Example 11 nanotubes before shearing.
Figure 17:
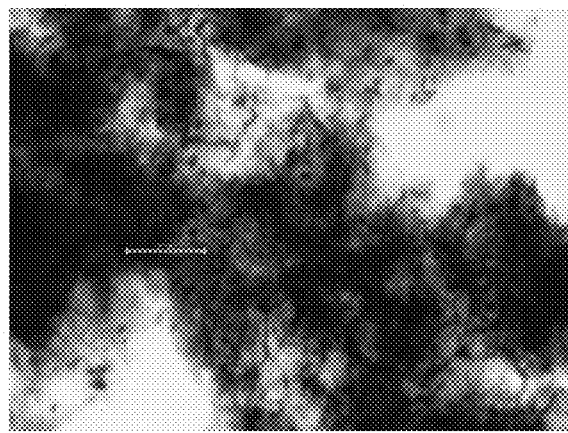
FIG. 17 shows Example 11 nanotubes after shearing.

A concentration of 0.3% high purity OCSiAl was added to cyrene and sonicated in a sonic bath for 150 minutes to create a dispersion of SWCNT in cyrene. FIG. 16 shows High purity OCSiAl SWCNT after 30 minutes sonication (169× magnification). FIG. 17 shows High purity OCSiAl SWCNT after 150 minutes sonication (169× magnification).

Example 12

500 grams of >64% nitric acid is heated to 95 degrees C. To the acid, 15 grams of as-received, single-walled carbon nanotubes (Tuball™) are added. The as-received tubes have the morphology of tightly bundled tree-trunks. The mixture of acid and carbon nanotubes are mixed while the solution is kept at about 95 degrees Celcius for 5 hours. At the end of the reaction period, the oxidized carbon nanotubes are filtered to remove the acid and washed with reverse osmosis (RO) water to pH of 4. The wet cake after washing was found to contain 3.6% solids. The resulting carbon nanotubes were determined by thermogravimetry to be oxidized to about 5% by weight and contained about 1.2% by weight of metal oxide residue. Optical microscopy showed the presence of "tree trunks". Experiment 12 in comparison to experiment 1 shows that the average % oxidation level can be controlled by the concentration of carbon nanotubes in the nitric acid.

Experiment 13. Using a Low Energy Intensive Mixer

The intent of experiments 13 and 14 are to demonstrate that a portion of the carbon nanotubes can be made to a different concentration of oxygen containing species attached to the outermost wall of the carbon nanotubes dependent on the degree of fibrillation of the carbon nanotubes in the reactant mixture.

27.5 g of the aqueous wet cake (1 g of carbon nanotubes) from experiment 12 is admixed using an overhead stirrer and a 1 inch diameter 4 blade propellor blade at 280 rpm. with 0.51 g of Jeffamine M2005, (Huntsman Chemical, monoamine terminated polyether of molecular weight average 2000 g/mole,) dissolved in 250 ml of ethanol. This gives 34% by weight of Jeffamine M2005 in the mixture of carbon nanotubes and Jeffamine M2005. When the carbon nanotube solution was added in full the rpm of the stirrer was increased to 400 and stirring continued for 1 hour. The carbon nanotubes were then filtered using a Buchner filter and washed four times with 35 ml of ethanol to remove non-coupled Jeffamine M2000. The carbon nanotubes and coupled Jeffamine M2005 was dried in vacuo, first at 90 degrees Celsius to dryness then at 140 degrees Celsius under vacuum to complete the reaction to form amide polyether functionalized carbon nanotubes. Thermogravimetric analysis gave 18.9% weight of oxygenated species on the carbon nanotube.

Experiment 14. Using a High Energy Intensive Mixer

As experiment 13 but the oxidized single wall carbon nanotubes were made up to 0.4% weight (2 g of carbon nanotubes from experiment 12) in a mixture of 50% isopropyl alcohol and 50% water containing 1.5 g of Jeffamine M2005. The mixture was passed through a high mechanical force mixer three times to significantly reduce the number of "tree trunks" seen optically using a microscope, as compared to experiment 13. After filtering, washing with isopropyl alcohol to remove non-coupled Jeffamine M2005 and drying as experiment 13 the thermogravimentric analyses gave the % of oxygenated material as 33% by weight.

Embodiments

1. A composition for use as a binder material, an electrolyte material or a separator film material of an energy storage or collection device, comprising: a plurality of high-surface area carbon nanotubes, wherein at least a portion of the high-surface area carbon nanotubes are open ended.

2. The composition of embodiment 1, wherein the plurality of high-surface area nanotubes are single walled nanotubes.

3. The composition of embodiment 1, further comprising at least one polymer.

4. The composition of embodiment 1, wherein the carbon nanotubes are further functionalized.

5. The composition of embodiment 1, further comprising at least one dispersion aid.

6. The composition of embodiment 3, wherein the polymer is selected from the group consisting of vinyl polymers, poly(styrene-butadiene), partially or fully hydrogenated poly(styrene butadiene) containing copolymers, functionalized poly(styrene butadiene) copolymers such as carboxylated poly(styrene butadiene), poly(styrene-isoprene), poly (methacrylic acid), poly(methylmethacrylate), poly(acrylic acid), poly(vinylalcohols), poly(vinylacetates), fluorinated polymers, polyvinylpyrrolidone, conductive polymers, polymers derived from natural sources, polyethers, polyesters, polyurethanes, and polyamides; homopolymers, graft, block or random co- or ter-polymers, and mixtures thereof.

7. The composition of embodiment 2, further comprising additional inorganic structures comprising elements of the groups two through fourteen of the Periodic Table of Elements.

8. The binder composition of embodiment 2 further comprising carbon structures selected from the group consisting of carbon black, graphite, graphene, oxidized graphene, fullerenes, and mixtures thereof.

9. The composition of embodiment 1, further comprising at least a portion of discrete carbon nanotubes.

10. The composition of embodiment 1, wherein the binder material has an impedance of less than or equal to about one billion ohm-m.

11. The composition of embodiment 1, where the electrolyte material or separator film has a charge transfer resistance of less than or equal to about 10 million ohm-m.

12. An electrode paste for a lead-acid battery comprising: high-surface area carbon nanotubes having an average length from about 1 μm to about 1,500 μm; and a polymer surfactant including polyvinyl alcohol.

13. In a composition comprising a plurality of high-surface area carbon nanotubes, wherein the carbon nanotubes comprise an interior and exterior surface, the improvement comprising: the interior surface comprising an interior surface oxidized species content and the exterior surface comprising an exterior surface oxidized species content, wherein the interior surface oxidized species content differs from the exterior surface oxidized species content by at least 20%, and as high as 100%.

14. The improvement of embodiment 13, wherein the interior surface oxidized species content is less than the exterior surface oxidized species content.

15. The improvement of embodiment 13, wherein the exterior surface oxidized species content comprises from about 1 to about 6 weight percent relative to carbon nanotube weight.

16. The improvement of embodiment 13, wherein the oxygenated species is selected from the group consisting of carboxylic acids, phenols, aldehydes, ketones, ether linkages, and combinations thereof.

17. A composition for use as a binder material, an electrolyte material or a separator film material of an energy storage or collection device, comprising: a plurality of high-surface area carbon nanotube bundles, wherein the high-surface area bundles comprise individual carbon nanotubes, wherein the aspect ratio of the individual nanotubes is between about 700 and about 1,500, and wherein the average length of the high-surface area carbon nanotube bundles is between about 800 microns and about 1,500 microns.

18. The composition of embodiment 17, wherein the nanotubes are oxidized.

19. The composition of embodiment 18, wherein the carbon nanotubes are further functionalized.

20. Yet another embodiment is a composition for use as a cathode material, an anode material, a binder material, an electrolyte material or a separator film material of an energy storage or collection device, comprising: a portion of carbon nanotubes that have a different amount of oxygen containing species than another portion.

21. A further embodiment is the composition of embodiment 20 further comprising a portion of the carbon nanotubes that differ from another portion of carbon nanotubes by an amount of oxygen containing species of at least about 0.2 weight percent.

22. Another embodiment of this invention is a composition for use as a cathode material, an anode material, a binder material, an electrolyte material or a separator film material of an energy storage or collection device, comprising: a portion of carbon nanotubes that have a different type of oxygen containing species than another portion.

23. A yet further embodiment of this invention is the composition of embodiment 22 further comprising a portion of the carbon nanotubes that have a different type of oxygen containing species of not more than 50% by weight of all carbon nanotubes with oxygen containing species.

We claim:

1. A composition for use as a cathode materials, an anode material, a binder material, an electrolyte material or a separator film material of an energy storage or collection device, comprising: a plurality of high-surface area carbon nanotubes, wherein the plurality of high-surface area nanotubes are single-wall nanotubes, wherein the BET surface area of the plurality of high-surface area nanotubes is from about 550 $m^2/g$ to about 1500 $m^2/g$ according to ASTM D6556-16 and wherein the aspect ratio is at least about 500, and wherein the plurality of high-surface area carbon nanotubes comprise less than about 1 weight percent of associated metal catalyst and wherein a portion of the plurality of high-surface area carbon nanotubes are oxidized and have a different amount of oxygen containing species than another portion.

2. The composition of claim 1, wherein the portion of the carbon nanotubes that differ from another portion of carbon nanotubes by an amount of oxygen containing species of at least about 0.2 weight percent based on the weight of the plurality of high-surface area nanotubes.

3. The composition of claim 1, further comprising at least one polymer.

4. The composition of claim 1, wherein the carbon nanotubes are further functionalized.

5. The composition of claim 1, further comprising at least one dispersion aid.

6. The composition of claim 5, wherein the dispersion aid comprises dehydrolevoglucosenone.

7. The composition of claim 3, wherein the polymer is selected from the group consisting of vinyl polymers, poly (styrene-butadiene), partially or fully hydrogenated poly (styrene butadiene) containing copolymers, functionalized poly(styrene butadiene) copolymers such as carboxylated poly(styrene butadiene), poly(styrene-isoprene), poly(methacrylic acid), poly(methylmethacrylate), poly(acrylic acid), poly(vinylalcohols), poly(vinylacetates), fluorinated polymers, polyvinylpyrrolidone, conductive polymers, polymers derived from natural sources, polyethers, polyesters, polyurethanes, and polyamides; homopolymers, graft, block or random co- or ter-polymers, and copolymers and mixtures thereof.

8. The composition of claim 1, wherein the composition has an impedance of less than or equal to about one billion ohm-m.

9. The composition of claim 1, wherein the electrolyte material or separator film has a charge transfer resistance of less than or equal to about 10 million ohm-m.

10. The composition of claim 1, which further comprises a cellulose-based polymer or salt thereof.

11. The composition of claim 10, wherein the cellulose-based polymer is carboxymethylcellulose or a salt thereof.

12. The composition of claim 1, which further comprises polystyrene sulfonate or a salt thereof.

13. The composition of claim 1, which further comprises a hydrophilic polymer.

14. A composition for use as a cathode material in a lithium ion battery comprising: a plurality of high-surface area carbon nanotubes, wherein the plurality of high-surface area nanotubes are single-wall nanotubes, wherein the BET surface area of the plurality of high-surface area nanotubes is from about 700 $m^2/g$ to about 2500 $m^2/g$ according to ASTM D6556-16 and wherein the aspect ratio is at least about 500, and wherein the plurality of high-surface area carbon nanotubes comprise less than about 1 weight percent of associated metal catalyst and wherein a portion of the plurality of high-surface area carbon nanotubes are oxidized and have a different amount of oxygen containing species than another portion.

15. The composition of claim 14, wherein the carbon nanotubes are oxidized and have an interior surface oxidized species content and an exterior surface oxidized species content and wherein the interior surface oxidized species content is less than the exterior surface oxidized species content.

16. The composition of claim 14, wherein the BET surface area of the plurality of high-surface area nanotubes is from about 1100 $m^2/g$ to about 2000 $m^2/g$ according to ASTM D6556-16.

17. The composition of claim 16, wherein the carbon nanotubes have an interior surface oxidized species content and an exterior surface oxidized species content and wherein the interior surface oxidized species content is less than the exterior surface oxidized species content.

\* \* \* \* \*